& Seas, PLLC

United States Patent [19]
Itoh et al.

[11] Patent Number: 6,042,906
[45] Date of Patent: Mar. 28, 2000

[54] FLAVOR-RETAINING PLASTIC MULTI-LAYER CONTAINER

[75] Inventors: Takurou Itoh, Yokosuka; Naoki Fukazawa; Yoshitsugu Maruhashi, both of Yokohama, all of Japan

[73] Assignee: Toyo Seikan Kaisha, Ltd., Tokyo, Japan

[21] Appl. No.: 08/909,939

[22] Filed: Aug. 12, 1997

[30] Foreign Application Priority Data

Aug. 12, 1996 [JP] Japan ..................................... 8-212835
Aug. 12, 1996 [JP] Japan ..................................... 8-212836
Aug. 12, 1996 [JP] Japan ..................................... 8-212906

[51] Int. Cl.⁷ ........................... B29D 22/00; B32B 27/32; B65D 81/24; B65D 85/00
[52] U.S. Cl. ....................... 428/35.2; 428/35.4; 428/35.7; 428/36.6; 428/36.7; 428/36.9; 428/36.91; 428/515; 428/516; 428/520
[58] Field of Search .................................. 428/35.2, 35.4, 428/35.7, 36.6, 36.7, 36.9, 36.91, 515, 516, 520

[56] References Cited

U.S. PATENT DOCUMENTS 5,532,030  7/1996  Hirose et al. .......................... 428/35.7
5,591,792  1/1997  Hattori et al. .......................... 524/271

FOREIGN PATENT DOCUMENTS 8-3332701  12/1996  Japan .
9-11416    1/1997   Japan .

*Primary Examiner*—Ellis Robinson
*Assistant Examiner*—Sandra M. Nolan
*Attorney, Agent, or Firm*—Sughrue, Mion, Zinn, Macpeak & Seas, PLLC

[57] ABSTRACT

A flavor-retaining multi-layer plastic container comprising an intermediate layer of a cyclic olefin copolymer and inner and outer layers of a non-cyclic olefin resin or an ethylene/vinyl alcohol copolymer jointed together via an adhesive, effectively eliminating the degradation in the adhesion when the container is filled with fragrant components and after the elapse of time. The flavor-retaining plastic multi-layer container comprises, inner and outer layers of a non-cyclic olefin resin, and an intermediate layer of a cyclic olefin copolymer adhered together via adhesive resin layers, wherein said adhesive resin is a linear very-low-density polyethylene having a density of from 0.800 to 0.910 g/cm³ obtained by the copolymerization of an ethylene with an α-olefin of an amount of from 6 to 20 mol % per the resin, or is an acid-modified product thereof.

20 Claims, 7 Drawing Sheets

FLAVOR-RETAINING PLASTIC MULTI-LAYER CONTAINER

BACKGROUND OF THE INVENTION

1. Field of the Invention

The present invention relates to a flavor-retaining plastic multi-layer container. More specifically, the invention relates to a flavor-retaining plastic multi-layer container having an intermediate layer of a cyclic olefin copolymer and inner and outer layers of an olefin resin or an ethylene/vinyl alcohol copolymer, preventing degradation in the adhesiveness among the layers when the container is filled with a content having fragrant components.

2. Prior Art

Plastic multi-layer containers have been extensively used for containing a variety of contents such as toothpaste, cosmetics, toiletries, chemicals, pastes and adhesives, highly viscous seasonings, foods and the like. In particular, the squeezable containers must have flexibility for squeezing out the content, and have been obtained by using ethylene polymers such as low-density polyethylene, ethylene/vinyl acetate copolymer and the like.

The multi-layer contains are obtained by using various plastic materials in combination in order to satisfy the requirements of moldability, manufacturing cost and properties for preserving the contents. The inner and outer layers of the containers, in many cases, are composed of a linear olefin resin such as polyethylene or polypropylene from the standpoint of moldability, sanitation and cost.

In order to prevent the permeation of oxygen through the container wall, it has long been known to use an oxygen-barrier resin as represented by, for example, a multi-layer extruded tube container comprising inner and outer layers of a low-density polyethylene and an intermediate layer of a saponified product of an ethylene/vinyl acetate copolymer (ethylene/vinyl alcohol copolymer) (e.g., Japanese Patent Publication No. 33223/1982).

It has also been known to produce a multi-layer container by utilizing the fact that a cyclic olefin copolymer exhibits excellent resistance against the permeation of moisture. For example, Japanese Laid-Open Patent Publication No. 276253/1992 discloses a container for medicines or foods, comprising many layers including two layers of different materials, at least one of the layer being composed of a thermoplastic norbornene polymer. There has further been taught to use a polypropylene modified by chlorination or with maleic anhydride in order to adhere the layers together.

Japanese Laid-Open Patent Publication No. 52340/1995 discloses a multi-layer plastic container of a structure in which at least two or more kinds of resin layers are laminated one upon the other, the outer layer being composed of an amorphous resin obtained by the copolymerization of a cyclic olefin with an ethylene, and the inner layer being composed of a polyolefin resin. The layers are adhered together by using an ethylene/α-olefin copolymer modified with an acid.

Japanese Laid-Open Patent Publication No. 266517/1995 discloses a moisture-proof multi-layer extruded structure constituted by at least three layers of resins and having excellent shock resistance, in which a polyolefin resin layer containing 5 to 60 mol % of a cyclic olefin component is interposed between the polyolefin resin layers. In this prior art, there has been disclosed to use the olefin resin modified with acid in order to adhere the layers, too.

The present inventors have previously discovered the fact that the flavor-retaining property of the container can be improved without adversely affecting the resistance against the contents or the sealing property when a cyclic olefin copolymer is used as an intermediate layer between the layers which are usually composed of a thermoplastic resin such as olefin resin (Japanese Laid-Open Patent Publication No. 11416/1997).

However, it was found that when a multi-layer container having an intermediate layer of a cyclic olefin copolymer and inner and outer layers of an olefin resin or an ethylene/vinyl alcohol copolymer, is filled with a content containing fragrant components, the adhesion among the layers is degraded to a conspicuous degree with the lapse of time. That is, the cyclic olefin copolymer and the olefin resin (non-cyclic olefin resin) poorly adhere together, the cyclic olefin copolymer and the ethylene/vinyl alcohol copolymer poorly adhere together, and, hence, an adhesive resin is interposed between the two resin layers as taught in the above-mentioned prior arts. Here, however, the adhesive resin that has heretofore been used exhibits a high adhesive strength before the container is filled with a fragrant content, but loses adhesive strength conspicuously with the lapse of time after the container is filled, giving rise to the occurrence of delamination.

It would appear quite queer that the laminate is delaminated despite the amount of the fragrant components is very small in the content. This is attributed to that the cyclic olefin copolymer existing as an intermediate layer works as a barrier against the fragrant components, and the fragrant components that have permeated through the inner layer of olefin resin or ethylene/vinyl alcohol copolymer act upon the interface between the cyclic olefin copolymer and the adhesive resin, to deteriorate the adhesion.

In the squeezable containers such as extrusion containers, the plastic material constituting the container wall must have a flexural rigidity which is as small as possible and a softness, so that the content can be smoothly extruded preventing the suck-back of the air (suction of the air by the container). For this purpose, a low-density polyethylene (LDPE) has been widely used as a material for constituting the walls of the squeezable containers.

On the other hand, the barrier property of the cyclic olefin copolymer against the fragrant components and moisture varies depending upon the glass transition point (Tg) of the cyclic olefin copolymer; i.e., the cyclic olefin copolymer having a higher glass transition point exhibits better barrier property.

It was found that a problem arises in the molding when a multi-layer container is molded by coextruding a cyclic olefin copolymer having a high glass transition point and a low-density polyethylene. That is, the cyclic olefin copolymer having a high glass transition point must be extruded at a high temperature. Accompanying a rise in the extrusion temperature, however, the low-density polyethylene develops draw-down, causing the thickness of the extruded product to be deviated, thickness of the walls to become nonuniform, and appearance of the containers to be deteriorated.

SUMMARY OF THE INVENTION

The present inventors have found the fact that the problem of degradation in the adhesion caused by the fragrant components is effectively solved by the use of a particular ethylene/α-olefin copolymer as an adhesive resin for adhering a cyclic olefin copolymer and an olefin resin or an ethylene/vinyl alcohol copolymer together.

That is, the object of the present invention is to provide a flavor-retaining plastic multi-layer container in which an intermediate layer of a cyclic olefin copolymer and inner and outer layers of an olefin resin or an ethylene/vinyl alcohol copolymer are joined together via an adhesive, effectively solving the problem of degradation in the adhesion that proceeds with the lapse of time after the container is filled with fragrant components.

Another object of the present invention is to provide a plastic multi-layer container comprising an intermediate layer of a cyclic olefin copolymer having a high glass transition point and inner and outer layers of a low-density polyethylene, preventing the draw-down and exhibiting uniformity in the thickness of the container wall, excellent appearance, flavor-retaining property, water-retaining property and property for extruding the content.

According to the present invention, there is provided a flavor-retaining plastic multi-layer container comprising inner and outer layers of a non-cyclic olefin resin, and an intermediate layer of a cyclic olefin copolymer adhered together via adhesive resin layers, wherein said adhesive resin is a linear very-low-density polyethylene having a density of from 0.800 to 0.910 g/cm³ obtained by the copolymerization of an ethylene with an α-olefin of an amount of from 6 to 20 mol % per the adhesive resin, or is an acid-modified product thereof.

According to the present invention, furthermore, there is provided a flavor-retaining plastic multi-layer container comprising inner and outer layers of a non-cyclic olefin resin, a first intermediate layer of a cyclic olefin copolymer, a second intermediate layer of an ethylene/vinyl alcohol copolymer, and adhesive resin layers, wherein said adhesive resin is a linear very-low-density polyethylene having a density of from 0.800 to 0.910 g/cm³ obtained by the copolymerization of an ethylene with an α-olefin of an amount of from 6 to 20 mol % per the adhesive resin, or is an acid-modified product thereof.

According to the present invention, furthermore, there is provided a flavor-retaining plastic multi-layer container comprising an inner layer of a non-cyclic olefin resin, a first intermediate layer of a cyclic olefin copolymer, a second intermediate layer of an ethylene/vinyl alcohol copolymer, a third intermediate layer of a cyclic olefin copolymer, and an outer layer of a non-cyclic olefin resin, which are laminated via adhesive resin layers, wherein the adhesive resin among the inner and outer layers and the layer of the cyclic olefin copolymer is a linear very-low-density polyethylene having a density of from 0.800 to 0.910 g/cm³ obtained by the copolymerization of an ethylene with an α-olefin of an amount of from 6 to 20 mol % per the adhesive resin or is an acid-modified product thereof, and the adhesive resin among the layers of the cyclic olefin copolymer and the layers of the ethylene/vinyl alcohol copolymer is an acid modified product of said linear very-low-density polyethylene.

Furthermore, according to the present invention, there is provided a flavor-retaining plastic multi-layer container comprising an inner layer of an ethylene/vinyl alcohol copolymer, an intermediate layer of a cyclic olefin resin and an outer layer of a non-cyclic olefin resin which are adhered together via adhesive resin layers composed of a linear very-low-density polyethylene having a density of from 0.800 to 0.910 g/cm³ obtained by the copolymerization of an ethylene with an α-olefin of an amount of from 6 to 20 mol % per the adhesive resin, or of an acid-modified product thereof.

In the flavor-retaining multi-layer plastic container of the present invention, it is desired that:

1. The α-olefin constituting the linear very-low-density polyethylene has from 4 to 8 carbon atoms;
2. The acid-modified product of the linear very-low-density polyethylene is obtained by being grafted with a maleic anhydride in an amount of from 0.1 to 0.6 mol % per the linear low-density polyethylene;
3. The linear very-low-density polyethylene or the acid-modified product thereof has a melt index (ASTM D1238, 190° C.) of from 0.4 to 30 g/10 min;
4. The non-cyclic olefin resin is a linear polyethylene, polypropylene, or crystalline ethylene/propylene copolymer;
5. The cyclic olefin copolymer contains cyclic olefin units in an amount of from 10 to 50% by weight;
6. The cyclic olefin copolymer has a glass transition point (Tg) of not lower than 60° C.;
7. The container as a whole has a thickness of from 100 to 1000 μm, and the ratio of the total thickness of the inner and outer layers to the thickness of the intermediate layer of the cyclic olefin copolymer is from 99:1 to 70:30, and the thickness of the adhesive layer is from 3 to 40 μm;
8. The container is a coextruded blow-molded container; and
9. The cyclic olefin copolymer has a glass transition point (Tg) of not lower than 60° C., and the non-cyclic olefin resin forming the inner and outer layers is a low-density polyethylene having a melt index (ASTM D1238, 190° C.) of not larger than 2 g/10 min. and, particularly, not larger than 0.8 g/10 min., and a logarithmic value of melt viscosity (220° C.) of not smaller than 4.7 and, particularly, not smaller than 5.0 of when a logarithmic value of shearing rate is extrapolated to zero.

Among the ethylene/α-olefin copolymers, the present invention uses a linear very-low-density polyethylene having a density of from 0.910 to 0.800 g/cm³ and, particularly, from 0.900 to 0.840 g/cm³ obtained by the copolymerization of an ethylene with from 6 to 20 mol % and, particularly, from 10 to 20 mol % of an α-olefin, or an acid-modified product thereof, in order to adhere the cyclic olefin copolymer and the non-cyclic olefin resin or the ethylene/vinyl alcohol copolymer together, while preventing degradation in the adhesion that will be caused by fragrant components and maintaining a high level of adhesive strength even after the lapse of time.

Like a widely known linear low-density polyethylene (LLDPE), the linear very-low-density polyethylene (VLDPE) used in the present invention is a copolymer of an ethylene and an α-olefin, and has branched chains based on the α-olefin. Here, the length and number of the branched chains give the density range lower than that of the LLDPE. That is, in general, the density decreases with an increase in the number of the branched chains. When the number of the branched chains remains the same, the density decreases with an increase in the length of the branched chains. In the present invention, the linear very-low-density polyethylene is used as an adhesive, in order to effectively prevent the degradation of adhesion caused by the fragrant components on the interface adhered to the cyclic olefin copolymer.

Reference should be made to Examples appearing later. When an ethylene/α-olefin copolymer having an α-olefin content of smaller than 6 mol % and a density of higher than 0.910 g/cm³ is used as an adhesive (Comparative Examples 1 and 2), the initial peeling strength is 2.0 kg/cm which is satisfactory but decreases to almost zero after the lapse of time when the container is filled with a tooth paste. The same holds even when an acid-modified product of the above copolymer is used (Comparative Examples 3 and 4). On the other hand, when an ethylene/α-olefin copolymer having an α-olefin content of not smaller than 6 mol % and a density of not larger than 0.910 g/cm³ is used as an adhesive (Examples 2 and 3), the peeling strength of not smaller than 1 kg/cm is still maintained after the lapse of time even when the container is filled with a toothpaste. When the ethylene/α-olefin copolymer having an α-olefin content of from 10 to 20 mol % and a density of from 0.900 to 0.840 g/cm³ is used as an adhesive (Examples 1, 4 and 5), in particular, the peeling strength of not smaller than 2.0 kg/cm is maintained after the lapse of time when the container is filled with the toothpaste. This holds even when an acid-modified product of the above-mentioned copolymer is used (Example 6).

When the ethylene/α-olefin copolymer that is not modified with an acid is used (Comparative Examples 7 to 10), the peeling strength between the cyclic olefin copolymer and the ethylene/vinyl alcohol copolymer is as low as 0.05 kg/cm. By using an acid-modificed product of this copolymer for adhering the cyclic olefin copolymer and the ethylene/vinyl alcohol copolymer together, however, the adhesive strength can be increased to such an extent that they can no longer be peeled off (Examples 7 and 8).

In the case of a tubular container for extruding the content, a compressive deforming stress is repetitively applied to the barrel of the container after a time interval due to the operation for extruding the content. Using the container of the present invention, permeation of the fragrant components is suppressed by the intermediate layer of a cyclic olefin copolymer and the delamination is not caused by the fragrant components. Therefore, the container maintains pleasing performance for extrusion yet favorably preserving the content.

The ethylene/vinyl alcohol copolymer loses gas barrier property conspicuously upon absorbing moisture. In the multi-layer plastic container of the present invention, however, the second intermediate layer of an ethylene/vinyl alcohol copolymer can be sandwiched by the first and third intermediate layers of a cyclic olefin copolymer, suppressing the permeation of water from the content to the ethylene/vinyl alcohol copolymer layer and the permeation of water from the external air to the ethylene/vinyl alcohol copolymer layer, enabling the ethylene/vinyl alcohol copolymer layer to exhibit excellent gas barrier property.

In the present invention, a cyclic olefin copolymer having a glass transition point (Tg) of not lower than 60° C. is preferably used, since it exhibits very superior barrier property against the fragrant components and water to those having a glass transition point (Tg) which is smaller than 60° C. For example, the cyclic olefin copolymer having a Tg of 5° C. permits L-menthol which is an index of fragrant component to permeate in an amount 10 times as great as that of the cyclic olefin copolymer having a Tg of 60° C. and further permits water vapor to permeate in an amount 5 times as great. This is why the present invention preferably uses a cyclic olefin copolymer having a Tg lying in the above-mentioned range.

Among various non-cyclic olefin resins, the present invention preferably uses a low-density polyethylene (LDPE), particularly a linear low-density polyethylene (LLDPE), as the inner and outer layers of the container, since it exhibits a flexural modulus of elasticity of from 2.0 to 6.0 MPa, enables the content to be smoothly extruded, and prevents the suck-back of the air.

DETAILED DESCRIPTION OF THE PREFERRED EMBODIMENTS

Figure 1:
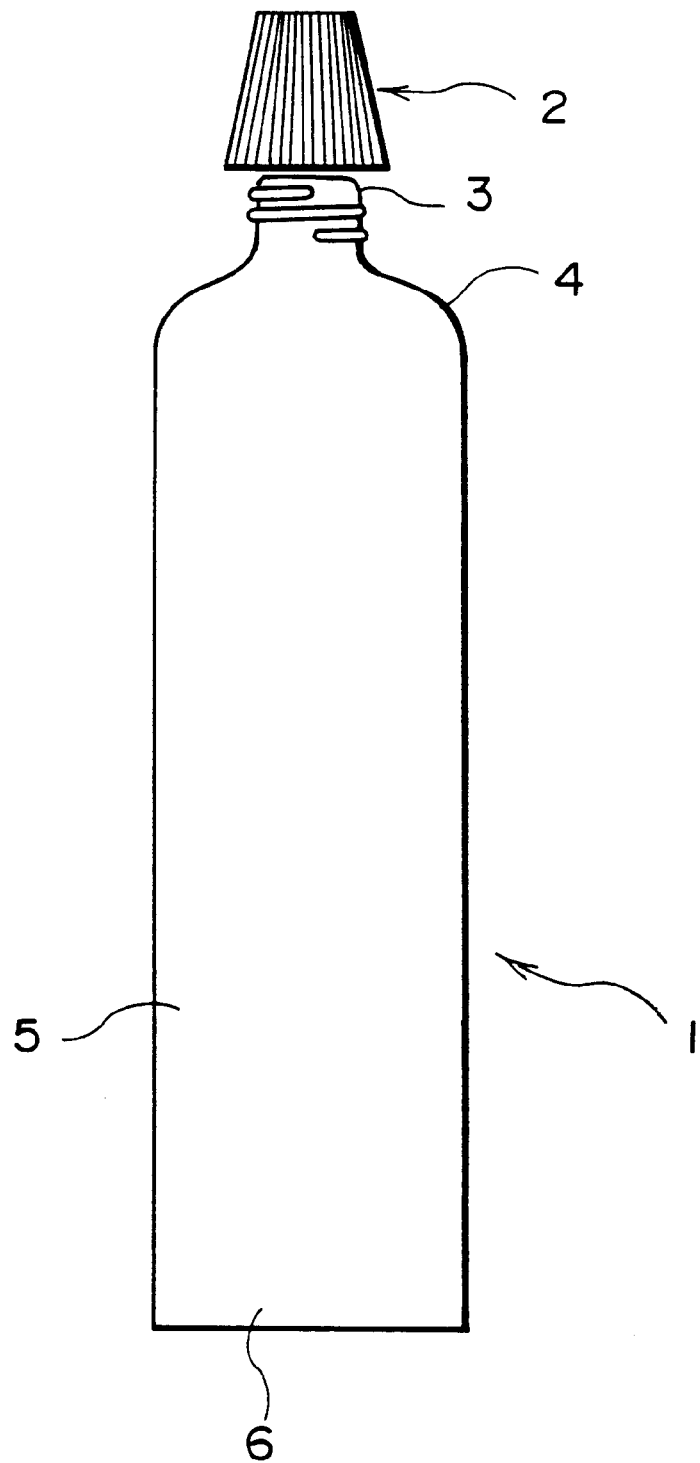
FIG. 1 is a side view illustrating a multi-layer container according to the present invention.

Referring to FIG. 1, a multi-layer container of the present invention comprises a tubular container 1 and a closure 2. The tubular container 1 has an extrusion mouth 3 with screw integrally formed by hollow-molding a parison, a conical shoulder portion 4 continuous thereto, and a narrow cylindrical barrel 5. The cylindrical barrel 5 has an edge portion that is cut. A content is charged through the edge portion and, then, the opposing inner surfaces of the barrel are melt-adhered together to form a sealed bottom portion.

Figure 2:
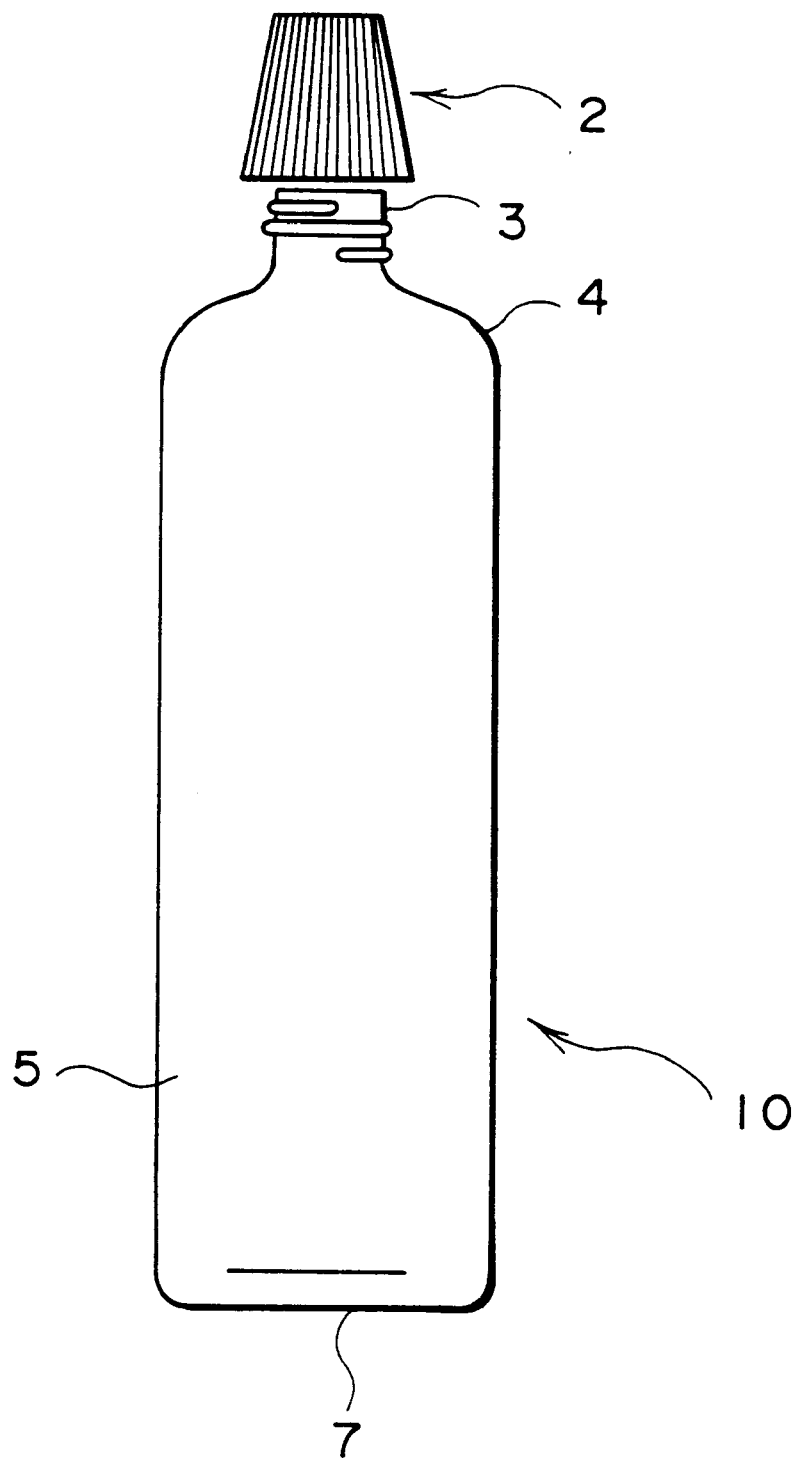
FIG. 2 is a side view illustrating another multi-layer container according to the present invention.

FIG. 2 illustrates another multi-layer container of the present invention which comprises a bottle-like container 10 and a closure 2. The bottle-like container 10 has a mouth 3 with screw integrally formed by hollow-molding a parison, a conical shoulder portion 4 continuous thereto, a cylindrical barrel 5 and a sealed bottom portion 7 formed by pinching-off the parison. In this container, the content is charged through the mouth 3, the closure 2 is fastened after the charging and is sealed.

Figure 3:
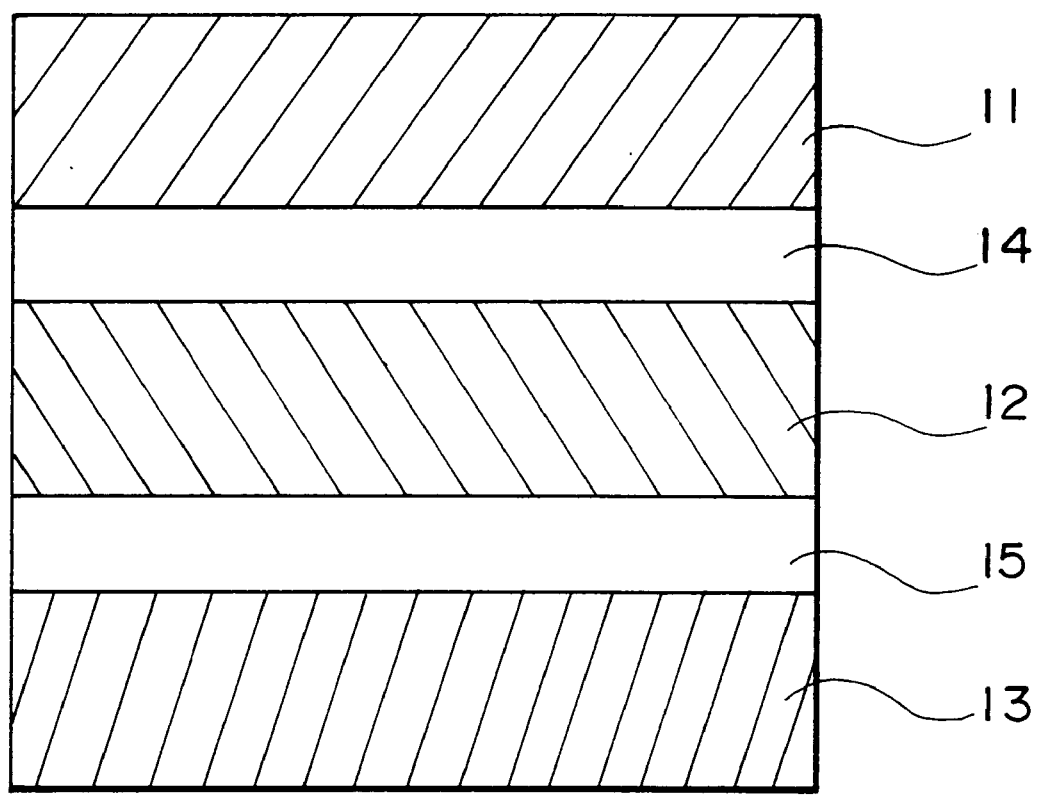
FIG. 3 is a sectional view illustrating, in cross section, the structure of a barrel of the container on an enlarged scale.

Referring to FIG. 3 illustrating, in cross section, the structure of the barrel 5 of FIG. 1 or FIG. 2 on an enlarged scale, the wall comprises an inner layer 11 of a non-cyclic olefin resin, an intermediate layer containing a cyclic olefin copolymer and an outer layer 13 of a non-cyclic olefin resin. Adhesive layers 14 and 15 composed of a linear very-low-density polyethylene are provided among the intermediate layer 12 and the inner and outer layers 11, 13.

Figure 4:
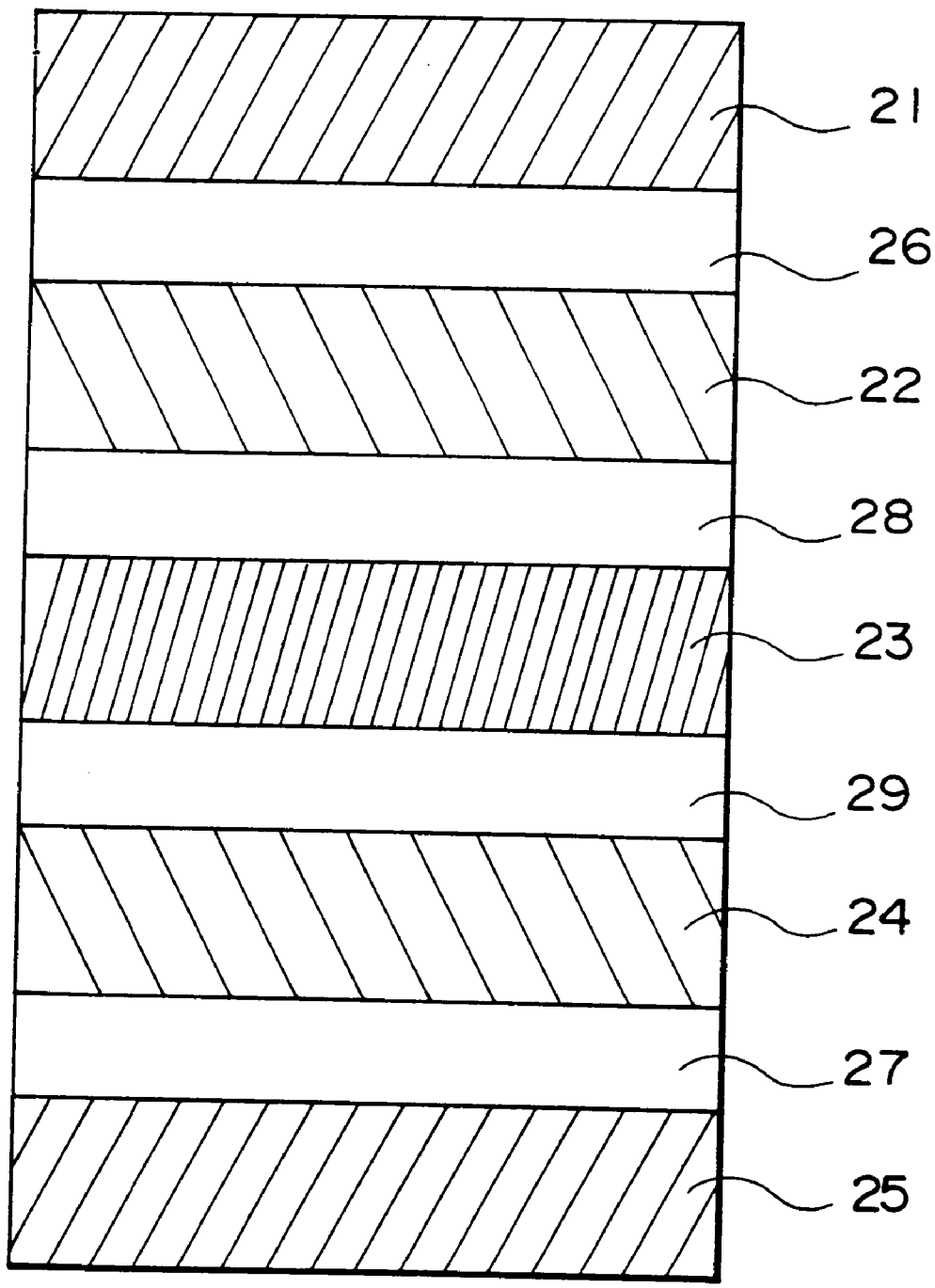
FIG. 4 is a sectional view illustrating, in cross section, the structure of a barrel of the another container on an enlarged scale.

Referring to FIG. 4 illustrating, in cross section, the structure of the barrel 5 of another embodiment on an enlarged scale, the wall comprises, from the inner side toward the outer side, an inner layer 21 of a non-cyclic olefin resin, a first intermediate layer 22 containing a cyclic olefin copolymer, a second intermediate layer 23 containing an ethylene/vinyl alcohol copolymer and serving as a gas barrier resin layer, a third intermediate layer 24 containing a cyclic olefin copolymer and an outer layer 25 of a non-cyclic olefin resin. Adhesive layers 26 and 27 of a linear very-low-density polyethylene or an acid-modified product thereof are provided between the inner layer 21 and the first intermediate layer 22 and between the outer layer 25 and the third intermediate layer 24. Furthermore, adhesive layers 28 and 29 of an acid-modified product of the linear very-low-density polyethylene are provided between the first intermediate layer 22 and the second intermediate layer 23 and between the second intermediate layer 23 and the third intermediate layer 24. This constitution is particularly suited for highly maintaining the gas barrier property of the wall, i.e., for suppressing a drop in the gas barrier property caused by moisture in the retort sterilization.

It is desired that the adhesive layers 28 and 29 are composed of an acid-modified product of the linear very-low-density polyethylene while the adhesive layers 26, 27 are composed of the linear very-low-density polyethylene which has not been modified or has been modified with an acid. In general, however, it is desired that the adhesive layers 26, 27, 28 and 29 are all composed of an acid-modified product of the linear very-low-density polyethylene from the standpoint of simplifying the adhesive composition, decreasing the number of the extruders and simplifying the die passages.

Figure 5:
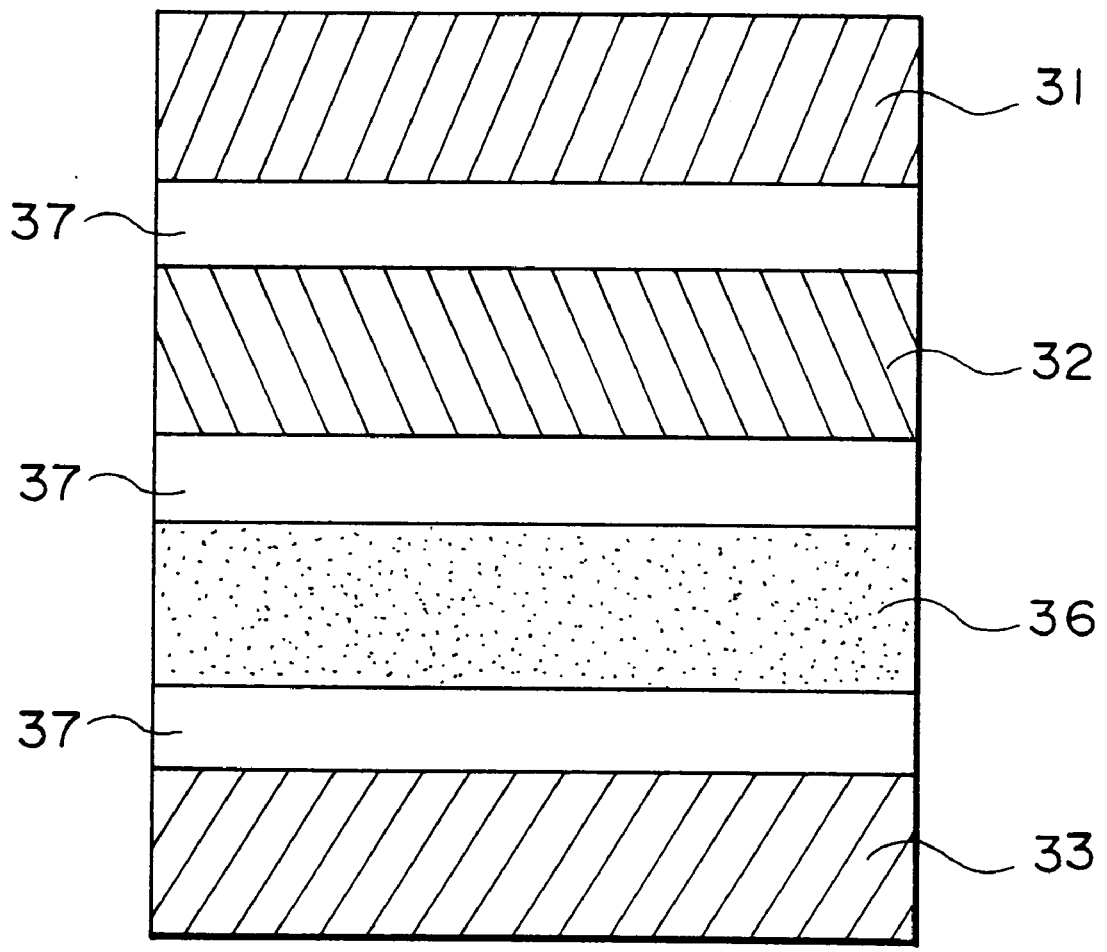
FIG. 5 is a sectional view illustrating, in cross section, the structure of a further multi-layer container of the present invention.

Referring to FIG. 5 illustrating, in cross section, a further structure of the barrel 5 on an enlarged scale, the wall comprises inner and outer layers 31 and 33 containing a low-density polyethylene, and an intermediate layer (first intermediate layer) 32 containing amorphous or low-crystalline copolymer (COC) of non-cyclic olefin and cyclic olefin, like that of FIG. 3, but further includes a second intermediate layer 36 containing a gas barrier thermoplastic resin via adhesive layers 37 and 37. In the embodiment of FIG. 5, the first intermediate layer 32 of COC is provided on the inner surface side of the wall, and the second intermediate layer 36 of the gas barrier resin is provided on the outer surface side of the wall. It should, however, be noted that the first intermediate layer 32 of COC may be provided on the outer surface side of the wall and the second intermediate layer 36 of the gas barrier resin may be provided on the inner surface side of the wall contrary to the above. When the gas barrier resin exhibits heat-adhesiveness to the COC or the olefin resin, the adhesive layers 37 may be omitted, as a matter of course.

The present invention uses the low-density polyethylene having a melt index (MI) of not larger than 2 g/10 min. and a logarithmic value (hereinafter also referred to as LMV) of melt viscosity (220° C.) of not smaller than 4.7 and, particularly, not smaller than 4.920 of when a logarithmic value of shearing rate is extrapolated to zero, in combination with the cyclic olefin copolymer of the intermediate layer. This prevents the draw-down of the low-density polyethylene during the coextrusion, eliminates deviation in the thickness, uniformalizes the thickness and improves the appearance.

Figure 6:
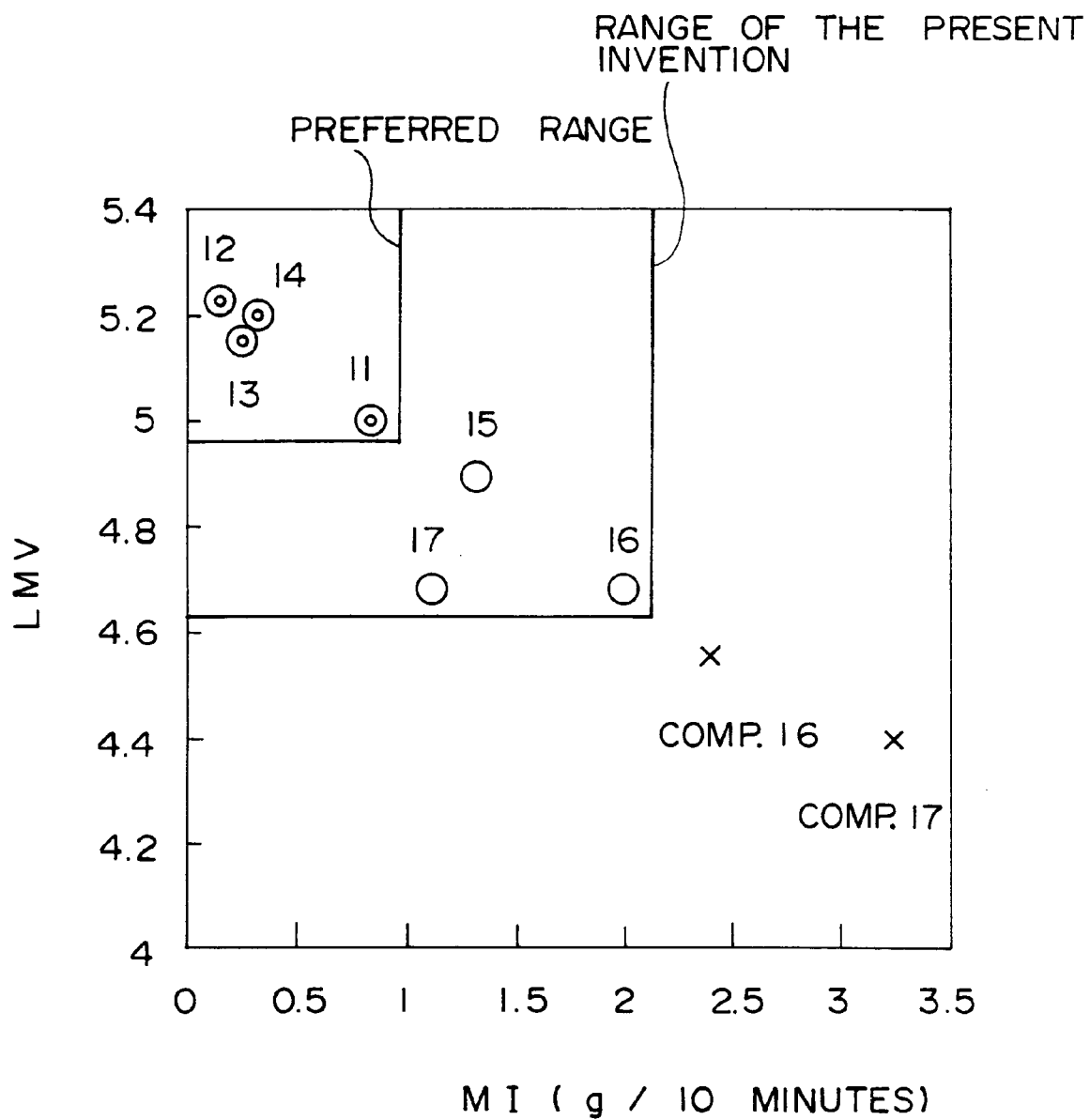
FIG. 6 is a graph plotting the results of preventing draw-down in the Examples together with the Example numbers, the abscissa representing the melt index (MI) and the ordinate representing the logarithmic value (LMV) of melt viscosity (220° C.) of when the logarithmic value of shearing rate is extrapolated to zero.

Reference should be made to FIG. 6. In FIG. 6 are plotted the results of preventing the draw-down of Examples that will be described later together with Example numbers, the abscissa representing the melt index and the ordinate representing the logarithmic value (often referred to as LMV) of melt viscosity (220° C.) of when the logarithmic value of shearing rate is extrapolated to zero. When the inner and outer layers of a low-density polyethylene having LMV smaller than the range of the present invention are extruded together with the cyclic olefin copolymer intermediate layer, there occurs the draw-down. When the low-density polyethylene having a logarithmic value of extrapolated melt viscosity lying within the range of the present invention is used, the draw-down is effectively prevented.

As pointed out already, the cyclic olefin copolymer having a glass transition point (Tg) of not lower than 60° C. exhibits excellent barrier property against the water vapor and fragrant components. In order to prevent the occurrence or infiltration of gel components, however, the cyclic olefin copolymer must be extrusion-molded at a high temperature which is considerably higher than a temperature at which the low-density polyethylene is usually extruded. As the temperature for extruding the low-density polyethylene increases, the inner and outer layers of the low-density polyethylene being extruded lose melt tension, giving rise to the occurrence of draw-down.

The present invention selectively uses a low-density polyethylene having MI lying over the above-mentioned range in order to prevent a drop in the melt tension at a high extrusion temperature. In the present invention, importance is given to the logarithmic value of melt viscosity (220° C.) of when the logarithmic value of shearing rate is extrapolated to zero. This is because even a low-density polyethylene exhibits a non-Newtonian fluidity, i.e., fluidity of which the melt viscosity decreases with an increase in the shearing rate like ordinary polymers. Here, the draw-down becomes a problem in the multi-layer coextrusion because the melt is in a state of having a very small shearing velocity after it has separated away from the die orifice, and increasing the melt viscosity in this state is effective in suppressing a drop in the melt tension.

Figure 7:
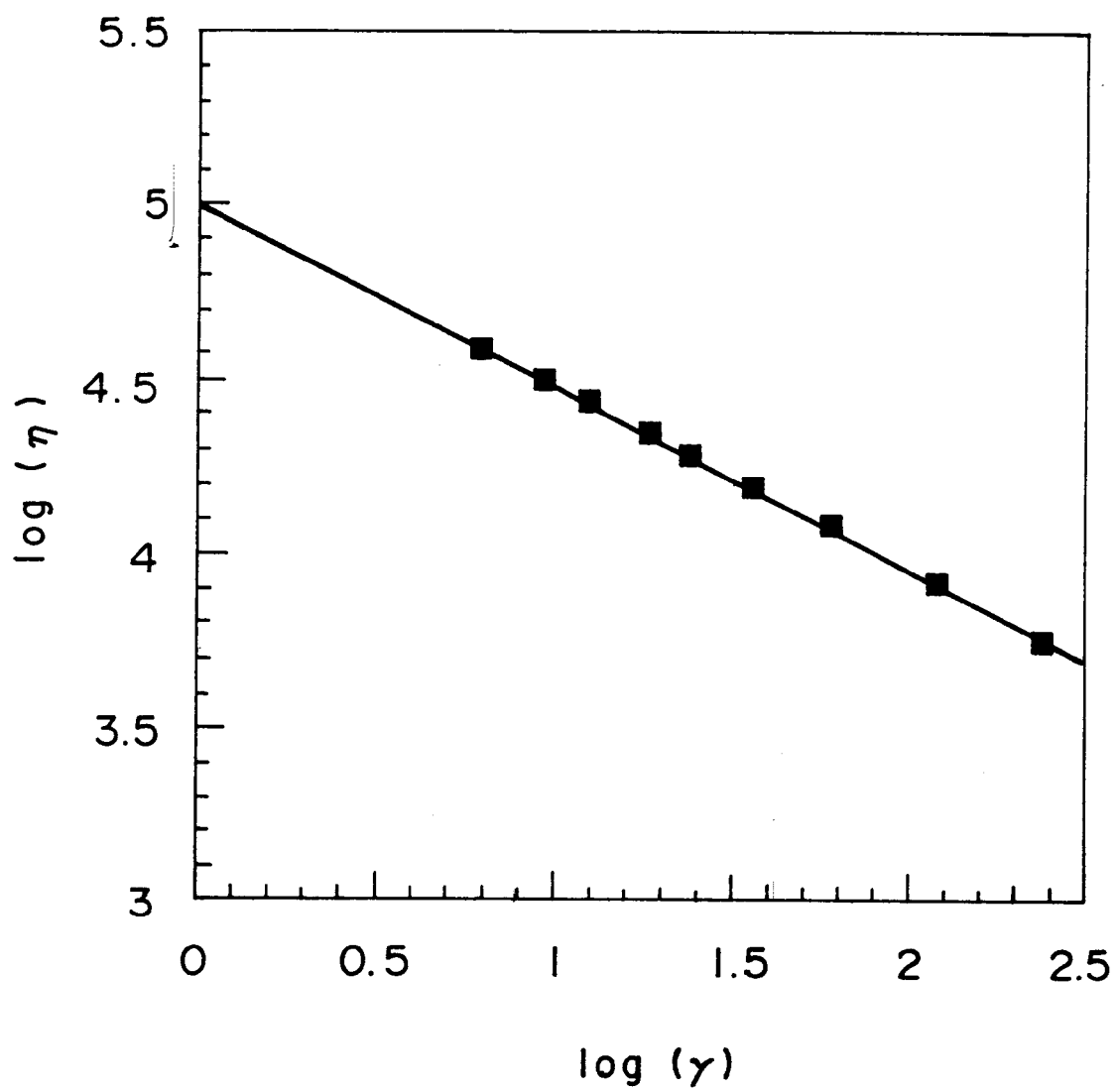
FIG. 7 is a diagram explaining how to find the logarithmic value (LMV) of melt viscosity (220° C.) of when the logarithmic value of shearing rate is extrapolated to zero.

Referring to FIG. 7 illustrating how to find the logarithmic value (LMV) of melt viscosity (220° C.) of a low-density polyethylene of when the logarithmic value of shearing rate is extrapolated to zero, the abscissa represents the logarithmic value log ($\gamma$) of the shearing rate and the ordinate represents the logarithmic value log ($\eta$) of the melt viscosity. In this logarithm-logarithm plotting, the measured values are nearly on a straight line (regression) from which it is obvious that an extrapolated value of when the logarithmic value of shearing rate is zero can be found as a point where the above straight line intersects a straight line of log ($\gamma$)=0. In the logarithm-logarithm plotting of FIG. 7, it is not allowed to find an extrapolated value at a zero shearing rate and, hence, an extrapolated value is found at a point where the logarithmic value becomes zero. Furthermore, the melt viscosity is measured at a temperature of 220° C. since it is close to a temperature for extruding the cyclic olefin copolymer.

According to the present invention as described above in detail, a low-density polyethylene having MI and LMV lying within particular ranges is used in combination with the cyclic olefin copolymer intermediate layer in order to obtain a multi-layer container without deviation in the thickness, and having uniform thickness, excellent appearance and excellent properties.

[Cyclic olefin copolymer]

A preferred example of non-cyclic olefin used in producing an amorphous or low-crystalline copolymer (COC) of an olefin and a cyclic olefin is an ethylene. Examples, however, further include α-olefins having 3 to 20 carbon atoms, such as propylene, 1-butene, 1-pentene, 1-hexene, 1octene, 3-methyl-l-pentene and 1-decene which may be used in a single kind or in combination with an ethylene.

Examples of the cyclic olefin basically include alicyclic hydrocarbon compounds having an ethylenically unsaturated bond and a bicyclo ring and, particularly, hydrocarbon compounds having a bicyclo[2. 2. 1]hepto-2-en skeleton. Though not specifically limited thereto only, concrete examples include: Bicyclo[2. 2. 1]hepto-2-en derivatives, such as compounds represented by the following formula (1),

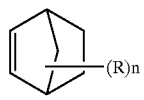

wherein R is a hydrogen atom, an alkyl group, a cycloalkyl group or an alkylidene group, and n is a number of from 1 to 4 (hereinafter the same), and, particularly, bicyclo[2. 2. 1]hepto-2-en,
6-methylbicyclo[2. 2. 1]hepto-2-en,
5,6-dimethylbicyclo[2. 2. 1]hepto-2-en,
1-methylbicyclo[2. 2. 1]hepto-2-en,
6-ethylbicyclo[2. 2. 1]hepto-2-en,
6-n-butylbicyclo[2. 2. 1]hepto-2-en,
6-isobutylbicyclo[2. 2. 1]hepto-2-en, and
7-methylbicyclo[2. 2. 1]hepto-2-en;

Tricyclo[4. 3. 0. $1^{2.5}$]-3-decene derivatives, compounds represented by the following formula (2),

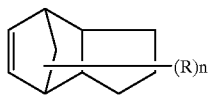

and, particularly, tricyclo[4. 3. 0. $1^{2.5}$]-3-decene,
2-methyltricyclo[4. 3. 0. $1^{2.5}$]-3-decene, and
5-methyltricyclo[4. 3. 0. $1^{2.5}$]-3-decene;

Tricyclo[4. 4. 0. $1^{2.5}$]-3-undecene derivatives, such as compounds represented by the following formula (3),

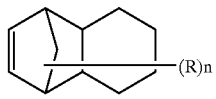

and particularly, tricyclo[4. 4. 0. $1^{2.5}$]-3-undecene, and
10-methyltricyclo[4. 4. 0. $1^{2.5}$]-3-undecene;

Tetracyclo[ 4. 4. 0. $1^{2.5}$. $1^{7.10}$]-3 dodecene derivatives, such as compounds represented by the following formula (4),

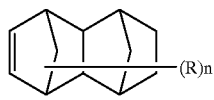

and particularly, tetracyclo[4. 4. 0. $1^{2.5}$. $1^{7.10}$]-3-dodecene,
8-methyltetracyclo[4. 4. 0. $1^{2.5}$. $1^{7.10}$]-3-dodecene,
8-ethyltetracyclo[4. 4. 0. $1^{2.5}$. $1^{7.10}$]-3-dodecene,
8-propyltetracyclo[4. 4. 0. $1^{2.5}$. $1^{7.10}$]-3-dodecene,
8-butyltetracyclo[4. 4. 0. $1^{2.5}$. $1^{7.10}$]-3-dodecene,
8-isobutyltetracyclo[4. 4. 0. $1^{2.5}$. $1^{7.10}$]-3-dodecene,
2-hexyltetracyclo[4. 4. 0. $1^{2.5}$. $1^{7.10}$]-3-dodecene,
8-cyclohexyltetracyclo[4. 4. 0. $1^{2.5}$. $1^{7.10}$]-3-dodecene,
8-stearyltetracyclo[4. 4. 0. $1^{2.5}$. $1^{7.10}$]-3-dodecene,
5,10-dimethyltetracyclo[4. 4. 0. $1^{2.5}$. $1^{7.10}$]-3-dodecene,
2,10-dimethyltetracyclo[4. 4. 0. $1^{2.5}$. $1^{7.10}$]-3-dodecene,
8,9-dimethyltetracyclo[4. 4. 0. $1^{2.5}$. $1^{7.10}$]-3-dodecene,
8-ethyl-9-methyltetracyclo[4. 4. 0. $1^{2.5}$. $1^{7.10}$]-3-dodecene,
11,12-dimethyltetracyclo[4. 4. 0. $1^{2.5}$. $1^{7.10}$]-3-dodecene,
2,7,9-trimethyltetracyclo[4. 4. 0. $1^{2.5}$. $1^{7.10}$]-3-dodecene,
2,7-dimethyl-9-ethyltetracyclo[4. 4. 0. $1^{2.5}$. $1^{7.10}$]-3-dodecene,
9-isobutyl-2,7-dimethyltetracyclo[4. 4. 0. $1^{2.5}$. $1^{7.10}$]-3-dodecene,
9,11,12-trimethyltetracyclo[4. 4. 0. $1^{2.5}$. $1^{7.10}$]-3-dodecene,
9-ethyl-11,12-dimethyltetracyclo[4. 4. 0. $1^{2.5}$. $1^{7.10}$]-3-dodecene,
9-isobutyl-11,12-dimethyltetracyclo[4. 4. 0. $1^{2.5}$. $1^{7.10}$]-3-dodecene,
5,8,9,10-tetramethyltetracyclo[4. 4. 0. $1^{2.5}$. $1^{7.10}$]-3-dodecene,
8-ethylidenetetracyclo[4. 4. 0. $1^{2.5}$. $1^{7.10}$]-3-dodecene,
8-ethylidene-9-methyltetracyclo[4. 4. 0. $1^{2.5}$. $1^{7.10}$]-3-dodecene,
8-ethylidene-9-ethyltetracyclo[4. 4. 0. $1^{2.5}$. $1^{7.10}$]-3-dodecene,
8-ethylidene-9-isopropyltetracyclo[4. 4. 0. $1^{2.5}$. $1^{7.10}$]-3-dodecene,
8-ethylidene-9-butyltetracyclo[4. 4. 0. $1^{2.5}$. $1^{7.10}$]-3-dodecene,
8-n-propylidenetetracyclo[4. 4. 0. $1^{2.5}$. $1^{7.10}$]-3-dodecene,
8-n-propylidene-9-methyltetracyclo[4. 4. 0. $1^{2.5}$. $1^{7.10}$]-3-dodecene,
8-n-propylidene-9-ethyltetracyclo[4. 4. 0. $1^{2.5}$. $1^{7.10}$]-3-dodecene,
8-n-propylidene-9-isopropyltetracyclo[4. 4. 0. $1^{2.5}$. $1^{7.10}$]-3-dodecene,
8-n-propylidene-9-butyltetracyclo[4. 4. 0. $1^{2.5}$. $1^{7.10}$]-3-dodecene,
8-isopropylidenetetracyclo[4. 4. 0. $1^{2.5}$. $1^{7.10}$]-3-dodecene,
8-isopropylidene-9-methyltetracyclo[4. 4. 0. $1^{2.5}$. $1^{7.10}$]-3-dodecene,
8-isopropylidene-9-ethyltetracyclo[4. 4. 0. $1^{2.5}$. $1^{7.10}$]-3-dodecene,
8-isopropylidene-9-isopropyltetracyclo[4. 4. 0. $1^{2.5}$. $1^{7.10}$]-3-dodecene, and
8-isopropylidene-9-butyltetracyclo[4. 4. 0. $1^{2.5}$. $1^{7.10}$]-3-dodecene;

Pentacyclo[6. 5. 1. $1^{3.6}$. $0^{2.7}$. $0^{9.13}$]-4-pentadecene derivatives, such as, compounds represented by the following formula (5),

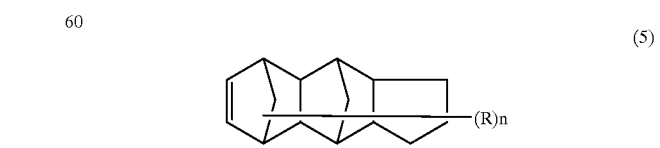

and particularly, pentacyclo[6. 5. 1. $1^{3.6}$. $0^{2.7}$. $0^{9.13}$]-4-pentadecene, 1,3-dimethylpentacyclo[6. 5. 1. $1^{3.6}$. $0^{2.7}$. $0^{9.13}$]-4pentadecene, 1,6-dimethylpentacyclo[6. 5. 1. $1^{3.6}$. $0^{2.7}$. $0^{9.13}$]-4-pentadecene, and 14,15-dimethylpentacyclo[6. 5. 1. $1^{3.6}$. $0^{2.7}$. $0^{9.13}$]-4-pentadecene;

Pentacyclo[7. 4. 0. $1^{2.5}$. $1^{9.12}$. $0^{8.13}$]-3-pentadecene derivatives, such as, compounds represented by the following formula (6),

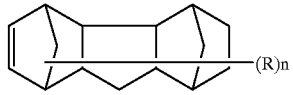

(6)

and particularly, pentacyclo[7. 4. 0. $1^{2.5}$. $1^{9.12}$. $0^{8.13}$]-3-pentadecene, and methyl-substituted pentacyclo[7. 4. 0. $1^{2.5}$. $1^{9.12}$. $0^{8.13}$]-3-pentadecene;

Pentacyclo[6. 5. 1. 13.6. $0^{2.7}$. $0^{9.13}$]-4,10-pentadecadiene derivatives, such as, compounds represented by the following formula (7),

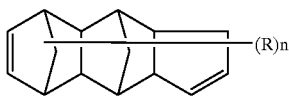

(7)

and particularly, pentacyclo[6. 5. 1. $1^{3.6}$. $0^{2.7}$. $0^{9.13}$]-4,10-pentadecadiene;

Pentacyclo[8. 4. 0. $1^{2.5}$. $1^{9.12}$. $0^{8.13}$]-3-hexadecene derivatives, such as, compounds represented by the following formula (8),

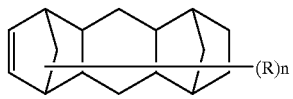

(8)

and particularly, pentacyclo[8. 4. 0. $1^{2.5}$. $1^{9.12}$. $0^{8.13}$]-3-hexadecene, 11-methyl-pentacyclo[8. 4. 0. $1^{2.5}$. $1^{9.12}$. $0^{8.13}$]-3-hexadecene, 11-ethyl-pentacyclo[8. 4. 0. $1^{2.5}$. $1^{9.12}$. $0^{8.13}$]-3-hexadecene, and 10,11-dimethyl-pentacyclo[8. 4. 0. $1^{2.5}$. $1^{9.12}$. $0^{8.13}$]-3-hexadecene;

Pentacyclo[6. 6. 1. $1^{3.6}$. $0^{2.7}$. $0^{9.14}$]-4-hexadecene derivatives, such as, compounds represented by the following formula (9),

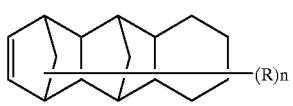

(9)

and particularly, pentacyclo[6. 6. 1. $1^{3.6}$. $0^{2.7}$. $0^{9.14}$]-4-hexadecene, 1,3-dimethylpentacyclo[6. 6. 1. $1^{3.6}$. $0^{2.7}$. $0^{9.14}$]-4-hexadecene, 1,6-dimethylpentacyclo[6. 6. 1. $1^{3.6}$. $0^{2.7}$. $0^{9.14}$]-4-hexadecene, and 15,16-dimethylpentacyclo[6. 6. 1. $1^{3.6}$. $0^{2.7}$. $0^{9.14}$]-4-hexadecene;

Hexacyclo[6. 6. 1. $1^{3.6}$. $1^{10.13}$. $0^{2.7}$. $0^{9.14}$]-4-heptadecene derivatives, such as, compounds represented by the following formula (10),

(10)

and particularly, hexacyclo[6. 6. 1. $1^{3.6}$. $1^{10.13}$. $0^{2.7}$. $0^{9.14}$]-4-heptadecene, 12-methylhexacyclo[6. 6. 1. $1^{3.6}$. $1^{10.13}$. $0^{2.7}$. $0^{9.14}$]-4-heptadecene, 12-ethylhexacyclo[6. 6. 1. $1^{3.6}$. $1^{10.13}$. $0^{2.7}$. $0^{9.14}$]-4-heptadecene, 12-isobutylhexacyclo[6. 6. 1. $1^{3.6}$. $1^{10.13}$. $0^{2.7}$. $0^{9.14}$]-4-heptadecene, and 1,6,10-trimethyl-12-isobutylhexacyclo[6. 6. 1. $1^{3.6}$. $1^{10.13}$. $0^{2.7}$. $0^{9.14}$]-4-heptadecene;

Heptacyclo[8. 7. 0. $1^{2.9}$. $1^{4.7}$. $1^{11.17}$. $0^{3.8}$. $0^{12.16}$]-5-eicosene derivatives, such as, compounds represented by the following formula (11),

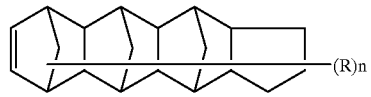

(11)

and particularly, heptacyclo[8. 7. 0. $1^{2.9}$. $1^{4.7}$. $1^{11.17}$. $0^{3.8}$. $0^{12.16}$]-5-eicosene;

Heptacyclo[8. 7. 0. $1^{3.6}$. $1^{10.17}$. $1^{12.15}$. $0^{2.7}$. $0^{11.16}$]-4-eicosene derivatives, such as, compounds represented by the following formula (12),

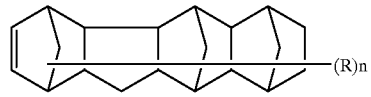

(12)

and particularly, heptacyclo[8. 7. 0. $1^{3.6}$. $1^{10.17}$. $1^{12.15}$. $0^{2.7}$. $0^{11.16}$]-4-eicosene, and dimethyl-substituted heptacyclo[8. 7. 0. $1^{3.6}$. $1^{10.17}$. $1^{12.15}$. $0^{2.7}$. $0^{11.16}$]-4-eicosene;

Heptacyclo[8. 8. 0. $1^{2.9}$. $1^{4.7}$. $1^{11.18}$. $0^{3.8}$. $0^{12.17}$]-5-heneicosene derivatives, such as compounds represented by the following general formula (13),

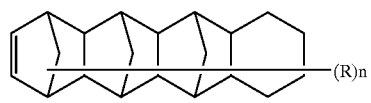

and particularly,
heptacyclo[8. 8. 0. $1^{2.9}$. $1^{4.7}$. $1^{11.18}$. $0^{3.8}$. $0^{12.17}$]-5-heneicosene;
Heptacyclo[8. 8. 0. $1^{4.7}$. $1^{11.18}$. $1^{13.16}$. $0^{3.8}$. $0^{12.17}$]-5-heneicosene derivatives, such as,
compounds represented by the following general formula (14),

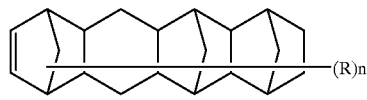

and, particularly,
heptacyclo[8. 8. 0. $1^{4.7}$. $1^{11.18}$. $1^{13.16}$. $0^{3.8}$. $0^{12.17}$]-5-heneicosene,
15-methyl-heptacyclo[8. 8. 0. $1^{4.7}$. $1^{11.18}$. $1^{13.16}$. $0^{3.8}$. $0^{12.17}$]-5-heneicosene, and
trimethyl-substituted heptacyclo[8. 8. 0. $1^{4.7}$. $1^{11.18}$. $1^{13.16}$. $0^{3.8}$. $0^{12.17}$]-5-heneicosene;
Octacyclo[8. 8. 0. $1^{2.9}$. $1^{4.7}$. $1^{11.18}$. $1^{13.16}$. $0^{3.8}$. $0^{12.17}$]-5-docosene derivatives, such as,
compounds represented by the following general formula (15),

and particularly,
octacyclo[8. 8. 0. $1^{2.9}$. $1^{4.7}$. $1^{11.18}$. $1^{13.16}$. $0^{3.8}$. $0^{12.17}$]-5-docosene,
15-methyloctacyclo[8. 8. 0. $1^{2.9}$. $1^{4.7}$. $1^{11.18}$. $1^{13.16}$. $0^{3.8}$. $0^{12.17}$]-5-docosene, and
15-ethyloctacyclo[8. 8. 0. $1^{2.9}$. $1^{4.7}$. $1^{11.18}$. $1^{13.16}$. $0^{3.8}$. $0^{12.17}$]-5-docosene;
Nonacyclo[10. 9. 1. $1^{4.7}$. $1^{13.20}$. $1^{15.18}$. $0^{2.10}$. $0^{3.8}$. $0^{12.21}$. $0^{14.19}$]-5-pentacosene derivatives, such as,
compounds represented by the following general formula (16),

and particularly,
nonacyclo[10. 9. 1. $1^{4.7}$. $1^{13.20}$. $1^{15.18}$. $0^{2.10}$. $0^{3.8}$. $0^{12.21}$. $0^{14.19}$]-5-pentacosene, and
trimethyl-substituted nonacyclo[10. 9. 1. $1^{4.7}$. $1^{13.20}$. $1^{15.18}$. $0^{2.10}$. $0^{3.8}$. $0^{12.21}$. $0^{14.19}$]-5-pentacosene;
Nonacyclo[10. 10. 1. $1^{5.8}$. $1^{14.21}$. $1^{16.19}$. $0^{2.11}$. $0^{4.9}$. $0^{13.22}$. $0^{15.20}$]-6-hexacosene derivatives, such as, compounds represented by the following general formula (17),

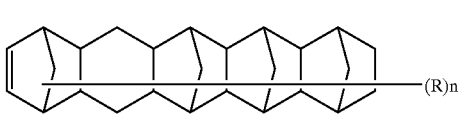

and particularly,
nonacyclo[10. 10. 1. $1^{5.8}$. $1^{14.21}$. $1^{16.19}$. $0^{2.11}$. $0^{4.9}$. $0^{13.22}$. $0^{15.20}$]-6-hexacosene derivatives.
Other examples of the cyclic olefin include the following:
5-phenyl-bicyclo[2. 2. 1]hepto-2-en,
5-methyl-5-phenylbicyclo[2. 2. 1]hepto-2-en,
5-benzyl-bicyclo[2. 2. 1]hepto-2-en,
5-tolyl-bicyclo[2. 2. 1]hepto-2-en,
5-(ethylphenyl)-bicyclo[2. 2. 1]hepto-2-en,
5-(isopropylphenyl)-bicyclo[2. 2. 1]hepto-2-en,
5-(biphenyl)-bicyclo[2. 2. 1]hepto-2-en,
5-(β-Naphthyl)-bicyclo[2. 2. 1]hepto-2-en,
5-(α-Naphthyl)-bicyclo[2. 2. 1]hepto-2-en,
5-(anthracenyl)-bicyclo[2. 2. 1]hepto-2-en,
5,6-diphenyl-bicyclo[2. 2. 1]Hepto-2-en,
cyclopentadiene-acenaphthylene adduct,
1,4-methano-1,4,4a,9a-tetrahydrofluorene,
1,4-methano-1,4,4a,5,10,10a-hexahydroanthracene,
8-phenyl-tetracyclo[4. 4. 0. $1^{2.5}$. $1^{7.10}$]-3-dodecene,
8-methyl-8-phenyl-tetracyclo[4. 4. 0. $1^{2.5}$. $1^{7.10}$]-3-dodecene,
8-benzyl-tetracyclo[4. 4. 0. $1^{2.5}$. $1^{7.10}$]-3-dodecene,
8-tolyl-tetracyclo[4. 4. 0. $1^{2.5}$. $1^{7.10}$]-3-dodecene,
8-(ethylphenyl)-tetracyclo[4. 4. 0. $1^{2.5}$. $1^{7.10}$]-3-dodecene,
8-(isopropylphenyl)-tetracyclo[4. 4. 0. $1^{2.5}$. $1^{7.10}$]-3-dodecene,
8,9-diphenyl-tetracyclo[4. 4. 0. $1^{2.5}$. $1^{7.10}$]-3-dodecene,
8-(biphenyl)tetracyclo[4. 4. 0. $1^{2.5}$. $1^{7.10}$]-3-dodecene,
8-(β-naphthyl)Tetracyclo[4. 4. 0. $1^{2.5}$. $1^{7.10}$]-3-dodecene,
8-(α-naphthyl)Tetracyclo[4. 4. 0. $1^{2.5}$. $1^{7.10}$]-3-dodecene,
8-(anthracenyl)-Tetracyclo[4. 4. 0. $1^{2.5}$. $1^{7.10}$]-3-dodecene,
compounds obtained by further adding cyclopentadiene to (cyclopentadiene-acenaphthylene adduct),
11,12-benzo-pentacyclo[6. 5. 1. $1^{3.6}$. $0^{2.7}$. $0^{9.13}$]-4-pentadecene,
11,12-benzo-pentacyclo[6. 6. 1. $1^{3.6}$. $0^{2.7}$. $0^{9.14}$]-4-hexadecene,
11-phenyl-hexacyclo[6. 6. 1. $1^{3.6}$. $1^{10.13}$. $0^{2.7}$. $0^{9.14}$]-4-heptadecene, and
14,15-benzo-heptacyclo[8. 7. 0. $1^{2.9}$. $1^{4.7}$. $1^{11.17}$. $0^{3.8}$. $0^{12.16}$-5-eicosene].

It is desired that the copolymer (COC) is derived from 50 to 22 mol % and, particularly, from 40 to 22 mol % of a cyclic olefin and a remainder of ethylene, and has a glass transition point (Tg) of not higher than 200° C. and, particularly, from 150 to 60° C.

There is no particular limitation on the molecular weight of the copolymer. It is, however, desired that the copolymer has a limiting viscosity [η] of from 0.1 to 5 dl/g as measured in a decalin at 135° C. and has the degree of crystallinity of, generally, not larger than 10% and, particularly, not larger than 5% as measured by the X-ray diffraction method.

The copolymer (COC) is obtained by the random polymerization of a non-cyclic olefin with a cyclic olefin in the presence of a widely-known vanadium catalyst or a metallocene catalyst.

A preferred copolymer (COC) is available from Mitsui Petrochemical Co. in the trade name of APEL.

[Non-cyclic Olefin resin]

Examples of the non-cyclic olefin resin include low-, medium- or high-density polyethylene, isotactic polypropylene, syndiotactic polypropylene, linear low-density polyethylene, ethylene/propylene copolymer, polybutene-1, ethylene/butene-1 copolymer, propylene/butene1 copolymer, ethylene/propylene/butene-1 copolymer, ethylene/vinyl acetate copolymer, ionically crosslinked olefin copolymer (ionomer), and ethylene/acrylic ester copolymer.

Among them, it is desired to use the polyethylene and the polypropylene. As the polypropylene, there can be used a homopolymer of propylene or a random copolymer or a block copolymer of propylene and ethylene.

The non-cyclic olefin resin (often reffered to as olefin resin) is usually of the extrusion grade, and there is preferably used a polyethylene having a melt index (ASTM D1238, 190° C.) of from 0.001 to 2 g/10 min. or a polypropylene having a melt index (ASTM D1238, 230° C.) of from 0.05 to 5 g/10 min.

The olefin resin may be blended with widely known blending agents such as pigment, filler, antioxidant, lubricant, stabilizer, ultraviolet-ray absorbing agent, etc. according to a widely known recipe.

The olefin resin of the inner layer and the olefin resin of the outer layer are usually of the same kind. Depending upon the use of the container, however, the olefin resin of the inner layer may be different from the olefin resin of the outer layer. For instance, the resin of the outer layer may have excellent lustering property or, conversely, delustering property, and the resin of the inner layer may be excellently molded.

In the present invention, a low-density polyethylene is preferably used as the olefin resin in order to improve property for smoothly extruding the content and to prevent suck-back of the air. Preferably, the low-density polyethylene has a melt index (ASTM D1238, 190° C.) of not larger than 2 g/10 min. and, particularly, not larger than 0.91 g/10 min. and a logarithmic value of melt viscosity (220° C.) of not smaller than 4.70 and, particularly, not smaller than 4.920 of when the logarithmic value of shearing rate is extrapolated to zero.

In general, it is desired that the low-density polyethylene has a density of from 0.910 to 0.940 g/cm$^3$ and, particularly, from 0.914 to 0.925 g/cm$^3$.

The low-density polyethylene used in the present invention is easily available from Nippon Conica Co., in the trade name of NUC.

[Adhesive layer]

In the present invention, the adhesive resin is a linear very-low-density polyethylene obtained by the copolymerization of an ethylene with from 6 to 20 mol % and, particularly, from 10 to 20 mol % of an α-olefin and having a density of from 0.800 to 0.910 g/cm$^3$ and, particularly, from 0.840 to 0.900 g/cm$^3$, or an acid-modified product thereof.

Preferred examples of the α-olefin include butene-1, pentene-1, hexene-1, octene-1, decene-1, and 4-methylpentene-1. It is particularly desired that the α-olefin has from 4 to 8 carbon atoms. Concrete examples of the copolymer include ethylene/butene-1 copolymer, ethylene/pentene-1 copolymer, ethylene/hexene-1 copolymer, ethylene/octene-1 copolymer and ethylene/4-methylpentene-1 copolymer, which may be used in a single kind or being blended in two or more kinds.

Under the condition where the copolymerization ratio and density of the α-olefin as a whole lie within the above-mentioned ranges, it should be understood that the linear very-low-density polyethylene may be used being blended with an ordinary linear low-density polyethylene (LLDPE).

It is desired that the linear very-low-density polyethylene used as an adhesive has a melt index (ASTM D1238, 190° C.) of from 0.4 to 30 g/10 min. and, particularly, from 1 to 20 g/10 min.

In the present invention, it is particularly desired to use a grafted copolymer obtained by grafting a linear very-low-density polyethylene with an unsaturated carboxylic acid or an anhydride thereof. This is because, the acid-modified linear very-low-density polyethylene is effective not only for adhering the cyclic olefin copolymer and the ethylene/vinyl alcohol copolymer together but also for adhering the non-cyclic olefin resin and the cyclic olefin copolymer together.

Examples of the unsaturated carboxylic acid or the anhydride thereof include monocarboxylic acid such as acrylic acid or methacrylic acid; polycarboxylic acid such as maleic acid, fumaric acid or itaconic acid; polycarboxylic anhydride such as maleic anhydride, itaconic anhydride or norbornene-2,3-dicarboxylic anhydride; and polycarboxylic acid monoester such as monomethyl maleate, monoethyl maleate or monoisobutyl maleate. Among them, maleic anhydride is preferably used.

It is desired that the unsaturated carboxylic acid or the anhydride thereof is grafted in an amount of from 0.1 to 0.6 mol % and, particularly, from 0.1 to 0.4 mol % with respect to the linear very-low-density polyethylene. When the amount exceeds the above-mentioned range, the adhesive strength tends to decrease.

[Gas barrier resin layer]

The container of the present invention can be provided with a gas barrier resin layer in order to further enhance preservation of the content and flavor-retaining property. The gas barrier resin layer is usually provided as an inner layer or an intermediate layer. As the gas barrier resin, it is desired to use a thermoplastic resin having an oxygen permeation coefficient ($PO_2$) of not larger than $5.5 \times 10^{-12}$ cc·cm/cm$^2$·sec·cmHg (37° C., 0% RH) and, particularly, not larger than $4.5 \times 10^{-12}$ cc·cm/cm·sec·cmHg (37° C., 0% RH), or a blend of the thermoplastic resins. The most preferred example of the resin is an ethylene/vinyl alcohol copolymer. Other examples of the gas barrier resin include nylon resin and, particularly, nylon 6, nylon 8, nylon 11, nylon 12, nylon 6, 6, nylon 6, 10, nylon 10, 6, nylon 6/6, 6 copolymer, and partly aromatic polyamide.

As the ethylene/vinyl alcohol copolymer, use is made of a saponified product of a copolymer obtained by saponifying an ethylene/vinyl acetate copolymer having an ethylene content of from 15 to 60 mol % and, particularly, from 20 to 50 mol %, so that the saponification degree becomes not smaller than 96 mol % and, particularly, not smaller than 99 mol %. It is desired that the saponified product of the ethylene/vinyl alcohol copolymer has a molecular weight large enough for forming a film, and has a viscosity of not smaller than 0.01 dl/g and, particularly, not smaller than 0.05 dl/g as measured in a mixture solvent of phenol and water at a weight ratio of 85:15 at a temperature of 30° C.

[Layer constitution]

It is desired that the container of the present invention has a total thickness of from 100 to 1000 μm and, particularly, from 200 to 900 μm, and a ratio of the thickness of the intermediate layer of the total thickness of the inner and outer layers to the cyclic olefin copolymer of from 99:1 to 70:30, and a ratio of the thickness of the intermediate layer of the gas barrier resin to the total thickness of the inner and outer layers of from 1:99 to 30:70.

The inner layer and the outer layer which are composed of a non-cyclic olefin resin may have an equal thickness. From the standpoint of retaining flavor of the content, however, it is desired that the intermediate layer composed of the cyclic olefin copolymer is provided being deviated toward the inner surface side. In this case, it is desired that the ratio of the thickness of the outer layer to the thickness of the inner layer is from 50:50 to 99:1 and, particularly, from 60:40 to 95:5.

Furthermore, the non-cyclic olefin resin may be provided between a cyclic olefin copolymer layer and a gas barrier resin layer.

If, in the present invention, the non-cyclic olefin resin denotes PO, the cyclic olefin resin denotes COC, the gas barrier resin denotes GB, the adhesive resin denotes AD, and the regenerated resin regenerated from the rubbish generated during the production or the recovered container denotes PCR, suitable examples of combined laminated structures are illustrated as follows.

5 layers structure:
  PO/AD/COC/AD/PO,
  GB/AD/COC/AD/PO
6 layers structure:
  PO/AD/COC/AD/PCR/PO,
  GB/AD/COC/AD/PCR/PO
7 layers structure:
  PO/AD/COC/AD/GB/AD/PO,
  GB/AD/COC/AD/GB/AD/PO,
  GB/AD/PO/AD/COC/AD/PO
8 layers structure:
  PO/PCR/AD/COC/AD/GB/AD/PO,
  PO/AD/GB/AD/COC/AD/PCR/PO,
  GB/AD/COC/AD/GB/AD/PCR/PO
9 layers structure:
  PO/PCR/AD/COC/AD/GB/AD/PCR/PO,
  PO/AD/COC/AD/PO/AD/GB/AD/PO,
  PO/AD/COC/AD/GB/AD/COC/AD/PO,
  GB/AD/COC/AD/GB/AD/COC/AD/PO
10 layers structure:
  GB/AD/PO/AD/COC/AD/PO/AD/GB/PO,
  PO/AD/COC/AD/GB/AD/COC/AD/PCR/PO
11 layers structure:
  GB/AD/PO/AD/COC/AD/PO/AD/GB/AD/PO,
  PO/PCR/AD/COC/AD/GB/AD/COC/AD/PCR/PO
12 layers structure:
  GB/AD/PO/AD/COC/AD/PO/AD/GB/AD/PCR/PO
13 layers structure:
  GB/PCR/AD/PO/AD/COC/AD/PO/AD/GB/AD/PCR/PO,
  PO/AD/COC/AD/PO/AD/GB/AD/PO/AD/COC/AD/PO It is desired that the cyclic olefin copolymer layer has a thickness of at least 25 μm and, preferably, from 30 to 300 μm from the standpoint of retaining flavor and shutting off moisture. It is further desired that the gas barrier resin layer has a thickness of at least 2 μm and, preferably, from 5 to 100 μm from the standpoint of shutting off the gas.

Desirably, furthermore, the adhesive layer has a thickness of from 3 to 40 μm and, particularly, from 5 to 30 μm.

[Multi-layer plastic container and process for its production]

The plastic multi-layer container of the present invention is produced by melting a cyclic olefin copolymer that forms an intermediate layer, a non-cyclic olefin resin or an ethylene/vinyl alcohol copolymer that forms an inner layer, a non-cyclic olefin resin that forms an outer layer, and a linear very-low-density polyethylene that forms an adhesive layer in their corresponding extruders, meeting them together in a die head so as to form an inner layer/adhesive layer/intermediate layer/adhesive layer/outer layer structure, and coextruding the laminate. Furthermore, the plastic multi-layer container of the present invention is produced by melting a cyclic olefin copolymer that forms first and third intermediate layers, an ethylene/vinyl alcohol copolymer that forms a second intermediate layer, a non-cyclic olefin resin or an ethylene/vinyl alcohol copolymer that forms an inner layer, a non-cyclic olefin resin that forms an outer layer, and a linear very-low-density polyethylene that forms an adhesive layer in their corresponding extruders, meeting them together in a die head so as to form an inner layer/adhesive layer/first intermediate layer/adhesive layer/second intermediate layer/adhesive layer/third intermediate layer/adhesive layer/outer layer structure, and coextruding the laminate. An intermediate layer rather than the above intermediate may be provided. Such a intermediate layer may be composed of the non-cyclic olefin resin or any other resin rather than the cyclic olefin copolymer or the ethylene/vinyl alcohol copolymer. The laminate is extruded through a ring die to form a molten parison, which is then blow-molded to produce a bottle or a tubular container. The laminate may further be extruded through a T-die or the like die to once form a sheet which is, then, heated and melted, and is subjected to the vacuum molding, compressed air molding or plag-assisted molding to produce a cup container.

In particular, the squeezable container which enables the content to be smoothly extruded is produced by melting a cyclic olefin copolymer and a low-density polyethylene having a melt index (ASTM D1238, 190° C.) of not larger than 2 g/10 min. and a logarithmic value of melt viscosity (220° C.) of not smaller than 4.70 of when the logarithmic value of shearing rate is extrapolated to zero, in their respective extruders, meeting them together in the die head with the cyclic olefin copolymer as an intermediate layer and the low-density polyethylene as inner and outer layers or as an outer layer, coextruding the laminate, and blow-molding the laminate.

A multi-layer multiple die is used as the die head. It is desired that the die head is heated at a temperature of, generally, from 220 to 250° C. from the standpoint of suppressing the draw-down tendency while preventing the cyclic olefin copolymer from being gelled, though the temperature may differ depending upon the kind of the cyclic olefin copolymer.

In effecting the coextrusion, a melt of the intermediate layer of the cyclic olefin copolymer or the ethylene/vinyl alchol copolymer is sandwiched by a melt of adhesive resin to form a molten laminate in the die, the molten laminate is overlapped on the molten inner layer or outer layer of the low-density polyethylene, and the thus overlapped laminate is extruded through an orifice of the die. In this case, the overlapping portion in the die has a relatively short length and the die head is maintained at a relatively low temperature to suppress the draw-down tendency while preventing the cyclic olefin copolymer or the ethylene/vinyl alchol copolymer from being gelled.

The multi-layer parison of the molten state extruded through the annular die orifice is blow-molded in a split mold and the bottom portion is pinched off to form a bottle having bottom. It is further possible to form a bottle of a small diameter, cut the bottom portion of the bottle, charge the content, and heat-seal the open end to obtain a tubular container.

Moreover, a pipe of a multi-layer structure is extruded and is cut to form a container barrel. Then, a mouth is separately formed by injection molding or compression molding, and is joined by melt-adhesion or the like method to produce a tubular container.

The multi-layer plastic container of the present invention is particularly useful for containing contents that contain fragrant components, such as ethanol, phenylethyl alcohol, benzyl acetate, menthol, pinene, acetic acid, and limonene. Concretely, the container of the invention can be used for containing cosmetic perfumes such as perfumed water, eau de Cologne, etc.; creams such as cleansing cream, cold cream, hand cream, vanishing cream, foundation cream, etc.; beauty wash such as astringent lotion, hand lotion, skin toning lotion, after shave lotion, etc.; hair tonics or hair cosmetics such as pomade, stick pomade, hair cream, hair lotion, hair tonic, etc.; powders such as water powder, cream powder, baby powder, etc.; and toiletries such as various liquid soaps, bath agents, bath salt, bubble bath, bath oil, detergents, shampoo, rinse, indoor cosmetic agent, de-odoring agent, toothpaste, leather cream, etc. Furthermore, the container of the invention can be used for containing various refreshing beverages such as carbonated drinks, juice-containing drinks, etc.; sweet products such as ice cream, custard pudding, jelly, chocolate, candies, biscuit, etc.; livestock products such as milk, butter, cheese, ham, sausage, beef, chicken, processed meat, etc.; see foods such as boiled fish paste, fish, shells, laver, etc.; teas such as green tea, woolong tea, black tea, cocoa, coffee, etc., liquors such as wines, herb liquors, liquors, etc.; and seasonings such as soy sauce, sauce, soup for buckwheat noodle, soup for fried foods, sauce for grilled meat, etc.

Among the ethylene/α-olefin copolymers, the present invention selects a linear very-low-density polyethylene obtained by the copolymerization with 6 to 20 mol % and, particularly, 10 to 20 mol % of the α-Olefin, and having a density of from 0.800 to 0.910 g/cm$^3$ and, particularly, from 0.840 to 0.900 g/cm$^3$, or an acid modified product thereof, and uses it for adhering the cyclic olefin copolymer and the non-cyclic olefin resin together in order to obtain a container which excellently retains flavor of the content, prevents degradation in the adhesion caused by fragrant components, and maintains the adhesive strength at a high level even after the elapse of time.

Even when the container is provided with a gas barrier resin layer composed of an ethylene/vinyl alcohol copolymer or the like, the above-mentioned acid-modified product is used for adhering the cyclic olefin copolymer and the gas barrier resin together, making it possible to prevent degradation in the adhesion caused by fragrant components and to maintain the adhesive strength at a high level even after the elapse of time. Moreover, preservation of the content is conspicuously improved owing to the formation of the first and third intermediate layers of the cyclic olefin copolymers in combination with the second intermediate layer of the ethylene/vinyl alcohol copolymer.

The conventional resin used for adhering the olefin layer and the gas barrier resin layer such as of an ethylene/vinyl alcohol copolymer is an acid modified product of an ethylene/α-olefin copolymer containing an α-olefin in an amount of not larger than 5 mol %. Use of the acid modified product of the ethylene/α-olefin copolymer containing an α-olefin in an amount of not smaller than 6 mol % as an adhesive, makes a quite novel feature of the present invention.

According to the present invention, in particular, a low-density polyethylene having a melt index (ASTM D1238, 190° C.) of not larger than 2 g/10 min. and, particularly, not larger than 0.8 g/10 min. and a logarithmic value of melt viscosity (220° C.) of not smaller than 4.7 and, particularly, not smaller than 4.920 of when the logarithmic value of shearing rate is extrapolated to zero, is used for forming the innermost layer and the outermost layer in combination with an intermediate layer of the cyclic olefin copolymer having a high glass transition point, in order to obtain a plastic multi-layer container preventing draw-down, and having uniform wall thickness, excellent appearance, flavor-retaining property, water-retaining property and property for extruding the content.

(Embodiments)

The invention will now be concretely described by way of Examples and Comparative Examples to which only, however, the invention is in no way limited.

In Examples and Comparative Examples, the testing and evaluation were conducted as described below.

(1) Measuring the peeling strength:

The bottle was filled with a toothpaste, sealed, introduced into a sealed glass container and was preserved in a constant-temperature oven maintained at 50° C. for four days. Next, the bottle was taken out, washed with water, dried with the air, cut into a piece measuring 15 mm×15 mm, and one end was immersed in toluene. While being immersed in toluene, the ethylene/cyclic olefin copolymer resin layer which is the intermediate layer dissolved, and whereby clamping portions (LDPE inner layer and LDPE outer layer) were formed for measuring the peeling strength. By using a tension tester manufactured by Orientek Co., a T-type tension testing was conducted at a tension speed of 300 mm/min. to measure the peeling strength. The measured result of peeling strength after treated with toluene was regarded to be the adhesive strength between the layer of the non-cyclic olefin resin and the layer of the ethylene/cyclic olefin copolymer. The test piece was further dissolved in the same manner as described above but using dimethyl sulfoxide (DMSO) instead of toluene. That is, the ethylene/vinyl alcohol copolymer resin was dissolved in DMSO to form cramping portions (inner and outer ends of the LDPE layer and COC layer). By using the tension tester manufactured by Orientek Co., a T-type tension testing was conducted at a tension speed of 300 mm/min. to measure the peeling strength. The measured result was regarded to be the adhesive strength between the layer of the ethylene/cyclic olefin copolymer resin and the layer of the ethylene/vinyl alcohol copolymer resin.

(2) Evaluation of flavor-retaining property:

The container was filled with 100 g of a toothpaste, and the mouth was heat-sealed with an aluminum foil-laminated film. Three such containers were sealed and preserved in a sealed glass container (volume: 1350 ml) with septum. The temperature for preservation was 37° C. After preserved for one month, a gas was picked up in an amount of 1 ml from the vapor phase in the sealed glass container with septum and was analyzed by a gas chromatography (GC). The GC analysis was conducted by using a G-column (60 m), GC-9A, manufactured by Shimazu Mfg. Co., at a column temperature of 160° C. and an injection port temperature of 220° C. by using helium as a carrier gas.

(3) Amount of adsorption of L-menthol.

A container filled with 60 g of a commercially available white toothpaste was preserved at 37° C. for four weeks, a portion of the container in contact with the content was cut in a size of 2 cm², and the L-menthol was extracted in about 1 ml of ethanol at 50° C. for 24 hours. The extract messed up in 10 ml of ethanol was used as a sample for gas chromatography. The amount of adsorption per a container was calculated from the inner surface area of the container. Flavor was lost as the amount of adsorption exceeded 10 mg/one container.

(4) Permeation of water.

The container was filled with water up to an upper level line, and the mouth was sealed with a sealing member. The container was preserved under the conditions of a temperature of 40° C. and an RH of 30% for 6 hours to adjust the temperature and humidity, and the weight of the container was measured. The container was further preserved under the condition of 40° C. and 30% RH, and the weight of the container was measured to measure a reduction in the amount of water. When the amount of water permeation exceeded 3%, the water-retaining property of the content was deteriorated.

(5) Testing melt viscosity:

By using a Capillograph manufactured by Toyo Seiki Co., low-density polyethylenes used for forming the innermost layer and the outermost layer were measured for their melt viscosities (poises) under the conditions of L/D=10, d=1 mm and a temperature of 220° C.

(6) Logarithmic value (LMV) of melt viscosity of when the logarithmic value of shearing rate is extrapolated to zero:

The same sample as used in the measurement of melt viscosity was measured for its melt viscosities ($\eta$, poises) while changing the shearing rate ($\gamma$, sec$^{-1}$), and were plotted on a double logarithmic graph to find a regression line of log ($\gamma$) and log ($\eta$). A value of long ($\eta$) at a point where the regression line intersects log ($\gamma$)=0 was regarded to be LMV.

(7) Melt index:

Measured in compliance with ASTM D1238.

(8) Draw-down property:

The draw-down property of when the tubular container was practically molded was evaluated on the following basis.

⊚: No draw-down occurs and the tube is molded without any problem.

o: Draw-down occurs but the tube is molded by decreasing the take-up speed during the molding.

X: Draw-down occurs so conspicuously that the tube is not molded.

EXAMPLE 1

(Resin)

A low-density polyethylene having a melt index (MI)=0.8 (ASTMD-1238 method) was used for the innermost and outermost layers. An ethylene/cyclic olefin copolymer having a cyclic olefin content of 22 mol % and Mw=130,000 was used for an intermediate layer. As an adhesive resin, furthermore, a linear very-low-density polyethylene (density=0.885 g/cm³, MI=4g/10 min.) of a copolymer of an ethylene and 11.5 mol % of a 1-butene was used for adhering together the innermost and outer most layers of the low-density polyethylene and the intermediate layer of the ethylene/cyclic olefin copolymer resin.

(Molding)

By using a multi-layer extruder having three screw extruders, a direct blow molding was effected to obtain a three-kind five-layer structure comprising the outermost layer of the low-density polyethylene resin, adhesive layers of the ethylene/α-olefin copolymer resin, intermediate layer of the ethylene/cyclic olefin copolymer resin, and innermost layer of low-density polyethylene resin. During the molding, the three cylinders were heated at different temperatures and, particularly, the ethylene/cyclic olefin copolymer resin was heated at 250° C. in a section of the cylinder. A cylindrical bottle of a volume of 180 ml was obtained having a total thickness of 600 $\mu$m and a layer ratio of 38%:2%:20%:2%:38%.

Tables 1 and 2 show the obtained results.

EXAMPLE 2

A bottle was produced in the same manner as in Example 1 but using, as an adhesive resin, a linear very-low-density polyethylene (MI=4) of a copolymer of an ethylene and 7 mol % of a 1-butene and having a density of 0.908 g/cm³. Table 1 shows the obtained results.

EXAMPLE 3

A bottle was produced in the same manner as in Example 1 but using, as an adhesive resin, a linear very-low-density polyethylene (MI=4) of a copolymer of an ethylene and 6 mol % of a 4-methyl-l-pentene and having a density of 0.902 g/cm³. Table 1 shows the obtained results.

EXAMPLE 4

A bottle was produced in the same manner as in Example 1 but using, as an adhesive resin, a linear very-low-density polyethylene (MI=4) of a copolymer of an ethylene and 20 mol % of a 1-butene and having a density of 0.842 g/cm³. Table 1 shows the obtained results.

EXAMPLE 5

A bottle was produced in the same manner as in Example 1 but using, as an adhesive resin, a linear very-low-density polyethylene (MI=4) of a copolymer of an ethylene and 10 mol % of a 1-octene and having a density of 0.860 g/cm³. Table 1 shows the obtained results.

EXAMPLE 6

A bottle was produced in the same manner as in Example 1 but using, as an adhesive resin, a linear very-low-density polyethylene of a copolymer of an ethylene and 11.5 mol % of a 1-butene and having a density of 0.884 g/cm³ graft-polymerized with a maleic anhydride (modification amount=0.2 mol %, MI=4). Table 1 shows the obtained results.

COMPARATIVE EXAMPLE 1

A bottle was produced in the same manner as in Example 1 but using, as an adhesive resin, a linear low-density polyethylene (MI=4) of a copolymer of an ethylene and 5 mol % of a 1-butene and having a density of 0.920 g/cm³. Table 1 shows the obtained results.

COMPARATIVE EXAMPLE 2

A bottle was produced in the same manner as in Example 1 but using, as an adhesive resin, a linear low-density polyethylene (MI=4) of a copolymer of an ethylene and 5 mol % of a 4-methyl-l-pentene and having a density of 0.910 g/cm³· Table 1 shows the obtained results.

COMPARATIVE EXAMPLE 3

A bottle was produced in the same manner as in Example 1 but using, as an adhesive resin, a linear low-density polyethylene of a copolymer of an ethylene and 5 mol % of a 1-butene and having a density of 0.920 g/cm$^3$ graft-polymerized with a maleic anhydride (modification amount=0.1 mol %, MI=4). Table 1 shows the obtained results.

COMPARATIVE EXAMPLE 4

A bottle was produced in the same manner as in Example 1 but using, as an adhesive resin, a linear low-density polyethylene of a copolymer of an ethylene and 5 mol % of a 1-butene and having a density of 0.918 g/cm$^3$ graft-polymerized with a maleic anhydride (modification amount=0.4 mol %, MI=4). Table 1 shows the obtained results.

COMPARATIVE EXAMPLE 5

A bottle was produced in the same manner as in Example 1 but using, as an intermediate layer, an ethylene/vinyl alcohol copolymer (ethylene content of 32 mol %, saponification degree of 99%) and using, as an adhesive resin, a linear low-density polyethylene of a copolymer of an ethylene and 5 mol % of a 1-butene and having a density of 0.918 g/cm$^3$ graft-polymerized with a maleic anhydride (modification amount=0.2 mol %, MI=4). Tables 1 and 2 show the obtained results.

COMPARATIVE EXAMPLE 6

A bottle was produced in the same manner as in Example 1 but using, as an adhesive resin, a poly-1-butene (density of 0.905 g/cm$^3$, MI=4). Table 1 shows the obtained results.

The following facts will be obvious from the above results.

From Table 1 above, it will be understood that the initial adhesive strength (before filled with toothpaste) is reaching the practical level irrespective of the copolymerization ratio or the density of the α-olefin in the ethylene/α-olefin. When filled with the toothpaste and preserved at 50° C., however, the adhesion strength varies being intimately related to the copolymerization ratio of the α-olefin or the density of the copolymer. That is, when the copolymerization ratio of the α-olefin is not larger than 5 mol %, the adhesive strength sharply drops with the lapse of time after filled with the toothpaste, and practical strength is not maintained. When the poly-1-butene (crystalline high polymer) is used as an adhesive in Comparative Example 6, the initial adhesive strength is not obtained, and the adhesion of the layer of non-cyclic olefin resin and the layer of ethylene/cyclic olefin copolymer cannot be discussed relying only upon the presence of short branched chains. That is, what is important is that the copolymerization ratio of the α-olefin of the ethylene/α-olefin copolymer lies within a predetermined range, and the density lies within a predetermined range.

In Comparative Examples 3 and 4 using a resin obtained by modifying the ethylene/α-olefin copolymer with an acid, the adhesive strength after preserved decreases to such a level as to develop delamination compared with those of Comparative Examples 1 and 2 in which the modification with an acid was not effected. It will then be understood that the modification of the ethylene/α-olefin copolymer with an acid does not plays a decisive role for accomplishing the adhesion. Referring to Example 6, the adhesive strength of a practical level is accomplished even when the modification with an acid is effected provided the copolymerization ratio of the α-olefin is not smaller than 6 mol %.

From Table 2, the amount of permeation of 1-menthol of when filled with the toothpaste is very smaller when the bottle of Example 1 is used than that of a conventional container using the ethylene/vinyl alcohol copolymer as an intermediate layer, from which it is understood that the container of Example 1 features a very high flavor-retaining property.

TABLE 1

|  | α-olefin | α-olefin content (mol %) | Modification amount with acid (mol %) | Density (g/cm$^3$) | Peeling strength of before filled with toothpaste (kg/cm) | Peeling strength of after filled with toothpaste (kg/cm) |
| --- | --- | --- | --- | --- | --- | --- |
| Ex. 1 | 1-butene | 11.5 | 0 | 0.885 | 3.2 | 2.7 |
| Ex. 2 | 1-butene | 7 | 0 | 0.908 | 2.6 | 1.2 |
| Ex. 3 | 4-methyl-1-pentene | 6 | 0 | 0.902 | 2.4 | 1.1 |
| Ex. 4 | 1-butene | 20 | 0 | 0.842 | 3.5 | 3.1 |
| Ex. 5 | 1-octene | 10 | 0 | 0.860 | 2.8 | 2.2 |
| Ex. 6 | 1-butene | 11.5 | 0.2 | 0.884 | 3.1 | 2.2 |
| Comp. Ex. 1 | 1-butene | 5 | 0 | 0.920 | 2.3 | 0.2 |
| Comp. Ex. 2 | 4-methyl-1-pentene | 5 | 0 | 0.910 | 2.2 | 0.2 |
| Comp. Ex. 3 | 1-butene | 5 | 0.1 | 0.920 | 2.1 | delaminated |
| Comp. Ex. 4 | 1-butene | 5 | 0.4 | 0.918 | 2.0 | delaminated |
| Comp. Ex. 5 | 1-butene | 5 | 0.2 | 0.918 | — | — |
| Comp. Ex. 6 | (poly-1-butene) | 100 | 0 | 0.905 | 0.05 or less | delaminated |

TABLE 2

|  | Permeation of L-menthol (μg/1350 ml) |
| --- | --- |
| Ex.1 | 0.42 |
| Comp.Ex.5 | 8.41 |

EXAMPLE 7

(Resin)

A low-density polyethylene (LDPE) having MI=0.8 (ASTMD-1238 method) was used for the innermost and outermost layers. An ethylene/cyclic olefin copolymer having a cyclic olefin content of 22 mol % and Mw=130,000 was used for the first and third intermediate layers. An ethylene/vinyl alcohol copolymer (EVOH) having an ethylene content of 32 mol % was used for the second intermediate layer. Furthermore, an ethylene/α-olefin copolymer resin containing 11.5 mol % of an α-olefin composed chiefly of 1butene modified with a maleic anhydride (modification amount of 0.2 mol %) was used for adhering together the innermost and outermost layers of the low-density polyethylene resin and layer of the ethylene/cyclic olefin copolymer resin, and for adhering the layer of the ethylene/cyclic olefin copolymer resin and the layer of the ethylene/vinyl alcohol copolymer.

(Molding)

By using a multi-layer extruder having four screw extruders, a direct blow molding was effected to obtain a four-kind nine-layer structure comprising the outermost layer of the low-density polyethylene resin, the first adhesive layer of the ethylene/α-olefin copolymer resin modified with an acid, the first intermediate layer of the ethylene/cyclic olefin copolymer resin, the second adhesive layer of the ethylene/α-olefin copolymer resin modified with an acid, the second intermediate layer of the ethylene/vinyl alcohol copolymer resin, the third adhesive layer of the ethylene/α-olefin copolymer resin modified with an acid, the third intermediate layer of the ethylene/cyclic olefin copolymer resin, the fourth adhesive layer of the ethylene/α-olefin copolymer resin modified with an acid, and the innermost layer of the low-density polyethylene resin. During the molding, the four cylinders were heated at different temperatures and, particularly, the ethylene/cyclic olefin copolymer resin was heated at 250° C. in a section of the cylinder. A cylindrical bottle of a volume of 180 ml was obtained having a total thickness of 600 μm and a layer ratio of 33%:2%:10%:2%:6%:2%:10%:2%:33%.

Tables 3 and 4 show the obtained results.

EXAMPLE 8

A bottle was produced in the same manner as in Example 7 but using, as an adhesive resin, an ethylene/α-olefin copolymer resin containing 6 mol % of an α-olefin composed chiefly of 1-butene modified with an acid (modification amount of 0.2 mol %). Table 3 shows the obtained results.

COMPARATIVE EXAMPLE 7

A bottle was produced in the same manner as in Example 7 but using, as an adhesive resin, an ethylene/α-olefin copolymer resin containing 11.5 mol % of an α-olefin composed chiefly of 1-butene. Table 3 shows the obtained results.

COMPARATIVE EXAMPLE 8

A bottle was produced in the same manner as in Example 7 but using, as an adhesive resin, an ethylene/α-olefin copolymer resin containing 6 mol % of an α-olefin composed chiefly of 1-butene. Table 3 shows the obtained results.

COMPARATIVE EXAMPLE 9

A bottle was produced in the same manner as in Example 7 but using, as an adhesive resin, an ethylene/α-olefin copolymer resin containing 10 mol % of an α-olefin composed chiefly of 1-octene. Table 3 shows the obtained results.

COMPARATIVE EXAMPLE 10

A bottle was produced in the same manner as in Example 7 but using, as an adhesive resin, an ethylene/α-olefin copolymer resin containing 5 mol % of an α-olefin composed chiefly of 1-butene. Table 3 shows the obtained results.

COMPARATIVE EXAMPLE 11

A bottle was produced in the same manner as in Example 7 but using, as an adhesive resin, an ethylene/α-olefin copolymer resin containing 5 mol % of an α-olefin composed chiefly of 4-methyl-l-pentene. Table 3 shows the obtained results.

COMPARATIVE EXAMPLE 12

A bottle was produced in the same manner as in Example 7 but using, as an adhesive resin, an ethylene/α-olefin copolymer resin containing 5 mol % of an α-olefin composed chiefly of 1-butene modified with an acid (modification amount of 0.1 mol %). Table 3 shows the obtained results.

COMPARATIVE EXAMPLE 13

A bottle was produced in the same manner as in Example 7 but having a three-kind five-layer structure (layer ratio of 38%:2%:20%:2%:38%) and using the ethylene/vinyl alcohol copolymer resin for forming one intermediate layer. Tables 3 and 4 show the obtained results.

COMPARATIVE EXAMPLE 14

A bottle was produced in the same manner as in Example 7 but using the poly-1-butene resin as an adhesive resin. Table 3 shows the obtained results.

TABLE 3

Peeling strength of when the containers are filled with a toothpaste and preserved at 50° C. for four days

| | | | | | LBPE/COC interface | | COC interface |
|---|---|---|---|---|---|---|---|
| | | α-olefin content (mol %) | Modification amount with acid (mol %) | Density (g/cm³) | Initially Peeling strength of before filled with toothpaste (kg/cm) | Treated with toluene Peeling strength of after filled with toothpaste (kg/cm) | Treated with DMSO Peeling strength of after filled with toothpaste (kg/cm) |
| | α-olefin | | | | | | |
| Ex. 7 | 1-butene | 11.5 | 0.2 | 0.884 | 3.1 | 2.2 | not peeled |
| Ex. 8 | 1-butene | 7 | 0.2 | 0.907 | 2.5 | 1.2 | not peeled |
| Co. Ex. 7 | 1-butene | 11.5 | 0 | 0.885 | 3.2 | 2.7 | 0.05 or less |
| Co. Ex. 8 | 1-butene | 7 | 0 | 0.908 | 2.6 | 1.2 | 0.05 or less |
| Co. Ex. 9 | 1-octene | 10 | 0 | 0.860 | 2.8 | 2.2 | 0.05 or less |
| Co. Ex. 10 | 1-butene | 5 | 0 | 0.920 | 2.3 | 0.2 or less | 0.05 or less |
| Co. Ex. 11 | 4-methyl-1-butene | 5 | 0 | 0.910 | 2.2 | 0.2 or less | 0.05 or less |
| Co. Ex. 12 | 1-butene | 5 | 0.1 | 0.920 | 2.1 | delaminated | could not be |

TABLE 3-continued

Peeling strength of when the containers are filled with a toothpaste and preserved at 50° C. for four days

| | α-olefin | α-olefin content (mol %) | Modification amount with acid (mol %) | Density (g/cm³) | LBPE/COC interface Initially Peeling strength of before filled with toothpaste (kg/cm) | LBPE/COC interface Treated with toluene Peeling strength of after filled with toothpaste (kg/cm) | COC interface Treated with DMSO Peeling strength of after filled with toothpaste (kg/cm) |
|---|---|---|---|---|---|---|---|
| Co. Ex. 13 | 1-butene | 5 | 0.1 | 0.920 | — | — | measured — |
| Co. Ex. 14 | poly-1-butene | 100 | 0 | 0.905 | 0.2 or less | delaminated | — |

1): COC = ethylene/cyclic olefin copolymer resin

TABLE 4

| | Permeation of L-menthol (μg/1350 ml) |
|---|---|
| Ex. 7 | 0.32 |
| Comp.Ex.13 | 8.41 |

From Table 3 above, the initial adhesive strength between the non-cyclic olefin resin and the ethylene/cyclic olefin copolymer resin is reaching the practical level irrespective of the content of the α-olefin. When filled with the toothpaste and preserved at 50° C., however, the adhesive strength greatly varies depending upon the content of the α-olefin in the adhesive resin and the density of the resin. When the α-olefin content is not larger than 5 mol % and the density of the adhesive resin is not smaller than 0.910 g/cm³, in particular, the adhesive strength sharply decreases and fails to maintain the practically required level. When the poly-1-butene (crystalline high polymer) is used as an adhesive in Comparative Example 11, the initial adhesive strength is not obtained, and the adhesion of the layer of non-cyclic olefin resin and the layer of ethylene/cyclic olefin copolymer cannot be discussed relying only upon the presence of short branched chains. That is, what is important is that the amount of α-olefin is not smaller than 6 mol % in the ethylene/α-olefin copolymer and the density thereof is not larger than 0.910 g/cm³ from the standpoint of effectively preventing the degradation in the adhesion caused by fragrant components.

In Comparative Examples 12 and 13 using resins modified with an acid, the adhesive strength after preserved decreases to such a level as to develop delamination compared with those of Comparative Examples 10 and 11 using resins that were not modified with an acid. As demonstrated by Example 8, however, the non-cyclic olefin resin and the ethylene/cyclic olefin copolymer resin could be adhered together by using, the base resin to be modified with an acid in which the amount of the α-olefin was not smaller than 6 mol % and, particularly, not smaller than 10 mol %.

Next, as will be understood from Table 3, modification with an acid is an essential requirement for adhering the layer of the ethylene/cyclic olefin copolymer resin and the layer of the ethylene/vinyl alcohol copolymer resin together. From the above results, the multi-layer container comprising an ethylene resin layer, an ethylene/cyclic olefin copolymer resin layer and an ethylene/vinyl alcohol copolymer resin layer, requires, as an adhesive resin, an ethylene/α-olefin copolymer resin and, particularly, an acid-modified product which uses, as a base polymer to be modified, an ethylene/α-olefin copolymer resin having an α-olefin content of not smaller than 6 mol % and, preferably, not smaller than 10 mol %.

From Table 4, the amount of permeation of 1-menthol of when filled with the toothpaste is very smaller when the bottle of Example 7 is used than that of a conventional container using the ethylene/vinyl alcohol copolymer as an intermediate layer, from which it is understood that the container of Example 7 features a very high flavor-retaining property.

EXAMPLE 9

A linear low-density polyethylene (LLDPE) having an MI of 1 g/10 min. and a logarithmic value of melt viscosity of 5.2 of when the logarithmic value of shearing rate was extrapolated to zero was fed as a base layer to a first extruder, an ethylene/α-olefin copolymer (EOC) graft-modified with maleic anhydride (modification amount: 0.2%) which has a density of 0.892 g/cm³ and contains 11.5 mol % of α-olefin was fed as an adhesive resin layer to a second extruder, an ethylene/vinyl alcohol copolymer (EVOH) containing 44 mol % of an ethylene and having a melting point of 165° C. was fed as an innermost layer to a third extruder, and an ethylene/cyclic olefin copolymer (COC) containing 22 mol % of a cyclic olefin was fed as a flavor-retaining layer to a fourth extruder, and an extrusion-molded multi-layer parison having a five-layer structure of LLDPE/EOC/COC/EOC/EVOH from the outer layer toward the inner layer was melt-blow-molded in a metal mold to obtain a multi-layer bottle. In the barrel of the thus obtained multi-layer bottle, the base layer (LLDPE) possessed a thickness of 360 μm, the adhesive resin layers possessed a thickness of 5 μm, the flavor-retaining resin layer possessed a thickness of 40 μm, and the innermost layer possessed a thickness of 20 μm. The end of bottom of the multi-layer bottle was cut to obtain a multi-layer tubular container having a volume of 350 ml.

Then, the mouth of the multi-layer tubular container was sealed with a heat-sealing member, the content was charged through the cut portion of the bottom, the air heated at a temperature of 400° C. was blown to the inner surface of the cut portion of the bottom to heat it at a heat-sealable temperature and to effect the heat-sealing thereby to obtain a multi-layer tubular package. Table 5 shows the results of evaluation.

EXAMPLE 10

A linear low-density polyethylene (LLDPE) having an MI of 1 g/10 min. and a logarithmic value of melt viscosity of 5.2 of when the logarithmic value of shearing rate is extrapolated to zero was fed as a base layer to a first extruder, an ethylene/α-olefin copolymer (EOC) graft-modified with maleic anhydride (modification amount: 0.2%) which has a density of 0.892 g/cm³ and contains 11.5 mol % of α-olefin was fed as an adhesive resin layer to a second extruder, an ethylene/vinyl alcohol copolymer (EVOH1) containing 44 mol % of an ethylene and having a melting point of 165° C. was fed as an innermost layer to a third extruder, an ethylene/cyclic olefin copolymer containing 22 mol % of a cyclic olefin was fed as a flavor-retaining layer to a fourth extruder, an ethylene/vinyl alcohol copolymer (EVOH2) containing 32 mol % of ethylene and having a melting point of 183° C. was fed as a gas barrier resin layer to a fifth extruder, and an extrusion-molded multi-layer parison having a seven-layer structure of LLDPE/EOC/EVOH2/EOC/COC/EOC/EVOH1 from the outer layer toward the inner layer was melt-blow-molded in a metal mold to obtain a multi-layer bottle. In the barrel of the thus obtained multi-layer bottle, the base layer (LLDPE) possessed a thickness of 300 μm, the adhesive resin layers possessed a thickness of 5 μm, the flavor-retaining resin layer possessed a thickness of 40 μm, the gas-barrier resin layer possessed a thickness of 20 μm, and the innermost layer possessed a thickness of 20 μm. The end of bottom of the multi-layer bottle was cut to obtain a multi-layer tubular container having a volume of 350 ml.

The mouth of the multi-layer tubular container was sealed with a sealing member, the content was charged through the cut portion of the bottom, the air heated at a temperature of 400° C. was blown to the inner surface of the cut portion of the bottom to heat it at a heat-sealable temperature and to effect the heat-sealing thereby to obtain a multi-layer tubular package. Table 5 shows the results of evaluation.

TABLE 5

| | α-olefin | Permeation of L-menthol (μg/1350 ml) | Amount of Adsorbing L-menthol (mg/container) | Water permeation (%) | Heat-sealing property |
|---|---|---|---|---|---|
| Ex. 9 | 1-butene | 0.40 | 7 | 1 | good |
| Ex. 10 | 1-butene | 0.30 | 7 | 1 | good |

EXAMPLE 11

(Sample)

A low-density polyethylene having a melt index (ASTMD 1238 method) of 0.8 and an LMV of 5.008 was used. A cyclic polyolefin copolymer containing 22 mol % of cyclic olefin and having Mw of 130,000 was used as a barrier layer. Moreover, an VLDPE resin was used for adhering the innermost layer, outermost layer, and intermediate layer of the cyclic polyolefin copolymer resin together.

(Molding)

By using a multi-layer extruder having four screw extruders, a direct blow molding was effected to obtain a multi-layer tube of a four-kind five-layer structure comprising the outermost layer of the low-density polyethylene resin, the adhesive layer of the LLDPE, the intermediate layer of the cyclic polyolefin copolymer resin (cyclic olefin component of 22 mol %, Mw=130,000), the adhesive layer of the LLDPE, and the innermost layer of the low-density polyethylene resin. The molding temperature at the die head was 220° C. In the barrel, the outer layer possessed a thickness of 270 μm, the adhesive layer possessed a thickness of 12 μm, the intermediate layer possessed a thickness of 120 μm, the adhesive layer possessed a thickness of 12 μm, and the inner layer possessed a thickness of 186 μm.

(Evaluation)

Table 6 shows the obtained results.

EXAMPLE 12

A tubular container was produced in the same manner as in Example 11 but using a resin having a melt index (ASTMD 1238 method) of 0.15 and an LMV of 5.258 as a low-density polyethylene resin. Table 6 shows the results.

EXAMPLE 13

A tubular container was produced in the same manner as in Example 11 but using a resin having a melt index (ASTMD 1238 method) of 0.24 and an LMV of 5.206 as a low-density polyethylene resin. Table 6 shows the results.

EXAMPLE 14

A tubular container was produced in the same manner as in Example 11 but using a resin having a melt index (ASTMD 1238 method) of 0.3 and an LMV of 5.224 as a low-density polyethylene resin. Table 6 shows the results.

EXAMPLE 15

A tubular container was produced in the same manner as in Example 11 but using a resin having a melt index (ASTMD 1238 method) of 1.3 and an LMV of 4.921 as a low-density polyethylene resin. Table 6 shows the results.

EXAMPLE 16

A tubular container was produced in the same manner as in Example 11 but using a resin having a melt index (ASTMD 1238 method) of 2.0 and an LMV of 4.703 as a low-density polyethylene resin. Table 6 shows the results.

EXAMPLE 17

A tubular container was produced in the same manner as in Example 11 but using a resin having a melt index (ASTMD 1238 method) of 1.1 and an LMV of 4.750 as a low-density polyethylene resin. Table 6 shows the results.

EXAMPLE 18

A tubular container was produced in the same manner as in Example 11 but using a cyclic polyolefin copolymer having a cyclic olefin content of 22 mol % and Mw of 100,000 as a barrier layer. Table 6 shows the results.

COMPARATIVE EXAMPLE 15

A tubular container was produced in the same manner as in Example 11 but using a resin having a melt index (ASTMD 1238 method) of 1.3 and an LMV of 4.921 as a low-density polyethylene resin and setting the molding temperature at 200° C. Table 6 shows the results.

COMPARATIVE EXAMPLE 16

A tubular container was produced in the same manner as in Example 11 but using a resin having a melt index (ASTMD 1238 method) of 2.4 as a low-density polyethylene resin. Table 6 shows the results.

COMPARATIVE EXAMPLE 17

A tubular container was produced in the same manner as in Example 11 but using a resin having a melt index (ASTMD 1238 method) of 3.2 and an LMV of 4.325 as a low-density polyethylene resin. Table 6 shows the results.

TABLE 6

| | Molding temp. (° C.) | MI of LDPE resin (ASTM D1238) | LMV, extrapolated value of shearing viscosity calculated from measured result of melt viscosity log (η) (poise) | Tube moldability (draw-dowm property) |
|---|---|---|---|---|
| Ex. 11 | 220 | 0.8 | 5.008 | ⊚ |
| Ex. 12 | 220 | 0.15 | 5.258 | ⊚ |
| Ex. 13 | 220 | 0.24 | 5.206 | ⊚ |
| Ex. 14 | 220 | 0.3 | 5.224 | ⊚ |
| Ex. 15 | 220 | 1.3 | 4.921 | ⊚ |
| Ex. 16 | 220 | 2.0 | 4.703 | ○ |
| Ex. 17 | 220 | 1.1 | 4.750 | ○ |
| Ex. 18 | 220 | 0.8 | 5.008 | ⊚ |
| Comp. Ex. 15 | 200 | 1.3 | 4.921 | x (Intermediate layer gelled) |
| Comp. Ex. 16 | 220 | 2.4 | 5.566 | x |
| Comp. Ex. 17 | 220 | 3.2 | 4.325 | x |

The following facts will be obvious from the above results. The molding must be carried out at a temperature of not lower than 220° C. in order to stably extrusion-mold the cyclic polyolefin copolymer (cyclic olefin component of 22 mol %, Mw=130,000) and the cyclic polyolefin copolymer (cyclic olefin component of 22 mol %, Mw=100,000) used for the intermediate layers. When the molding temperature is lower than the above temperature, the intermediate layers are gelled (Comparative Example 15).

By using a low-density polyethylene having a melt index of not larger than 2 g/10 min. and, particularly, not larger than 0.8 g/10 min and an LMV of not smaller than 4.7 and, particularly, not smaller than 4.920 in combination with the cyclic olefin copolymer, furthermore, it is made possible to smoothly mold a tube without developing draw-down (Examples 11 to 18). When these values lie outside of the above-mentioned ranges as in Comparative Examples 16 and 17, on the other hand, the tube is not smoothly molded due to draw-down caused by a decrease in the melt tension when the parison is being molded.

We claim:

1. A flavor-retaining plastic multi-layer container comprising, inner and outer layers of a non-cyclic olefin resin, and an intermediate layer of a cyclic olefin copolymer adhered together via adhesive resin layers, wherein said adhesive resin is a linear very-low-density polyethylene having a density of from 0.800 to 0.910 g/cm$^3$ obtained by the copolymerization of an ethylene with an α-olefin of an amount of from 6 to 20 mol % per the adhesive resin, or is an acid-modified product thereof, wherein the cyclic olefin copolymer has a glass transition point (Tg) of not lower than 60° C., and the non-cyclic olefin resin forming the inner and outer layers is a low-density polyethylene having a melt index (ASTM D1238, 190° C.) of not larger than 2 g/10 min., and a logarithmic value of melt viscosity (220° C.) of not smaller than 4.7 of when a logarithmic value of shearing rate is extrapolated to zero.

2. A flavor-retaining plastic multi-layer container according to claim 1, wherein the α-olefin constituting the linear very-low-density polyethylene of said adhesive resin has from 4 to 8 carbon atoms.

3. A flavor-retaining plastic multi-layer container according to claim 1, wherein the acid-modified product of the linear very-low-density polyethylene is obtained by being grafted with a maleic anhydride in an amount of from 0.1 to 0.6 mol % per the linear very-low-density polyethylene.

4. A flavor-retaining plastic multi-layer container according to claim 1, wherein the linear very-low-density polyethylene or the acid-modified product thereof has a melt index (ASTM D1238, 190° C.) of from 0.4 to 30 g/10 min.

5. A flavor-retaining plastic multi-layer container according to claim 1, wherein the cyclic olefin copolymer contains cyclic olefin units in an amount of from 10 to 50% by weight.

6. A flavor-retaining plastic multi-layer container according to claim 1, wherein a wall of the container as a whole has a thickness of from 100 to 1000 μm, a ratio of the total thickness of the inner and outer layers to the thickness of the intermediate layer of the cyclic olefin copolymer is from 99:1 to 70:30, and the thickness of the adhesive layer is from 3 to 40 μm.

7. A flavor-retaining plastic multi-layer container according to claim 1, wherein the container is a coextruded blow-molded container.

8. A flavor-retaining plastic multi-layer container comprising, inner and outer layers of a non-cyclic olefin resin, a first intermediate layer of a cyclic olefin copolymer, a second intermediate layer of an ethylene/vinyl alcohol copolymer, and adhesive resin layers, wherein said adhesive resin is a linear very-low-density polyethylene having a density of from 0.800 to 0.910 g/cm$^3$ obtained by the copolymerization of an ethylene with an α-olefin of an amount of from 6 to 20 mol % per the adhesive resin, or is an acid-modified product thereof, wherein the cyclic olefin copolymer has a glass transition point (Tg) of not lower than 60° C., and the non-cyclic olefin resin forming the inner and outer layers is a low-density polyethylene having a melt index (ASTM D1238, 190° C.) of not larger than 2 g/10 min., and a logarithmic value of melt viscosity (220° C.) of not smaller than 4.7 of when a logarithmic value of shearing rate is extrapolated to zero.

9. A flavor-retaining plastic multi-layer container comprising an inner layer of a non-cyclic olefin resin, a first intermediate layer of a cyclic olefin copolymer, a second intermediate layer of an ethylene/vinyl alcohol copolymer, a third intermediate layer of a cyclic olefin copolymer, and an outer layer of a non-cyclic olefin resin, which are laminated via adhesive resin layers, wherein the adhesive resin among the inner and outer layers and the layer of the cyclic olefin copolymer is a linear very-low-density polyethylene having a density of from 0.800 to 0.910 g/cm$^3$ obtained by the copolymerization of an ethylene with an α-olefin of an amount of from 6 to 20 mol % per the adhesive resin or is an acid-modified product thereof, and the adhesive resin among the layers of the cyclic olefin copolymer and the layers of the ethylene/vinyl alcohol copolymer is an acid modified product of said linear very-low-density polyethylene, wherein the cyclic olefin copolymer has a glass transition point (Tg) of not lower than 60° C., and the non-cyclic olefin resin forming the inner and outer layers is a low-density polyethylene having a melt index (ASTM D1238, 190° C.) of not larger than 2 g/10 min. and a logarithmic value of melt viscosity (220° C.) of not smaller than 4.7 of when a logarithmic value of shearing rate is extrapolated to zero.

10. A flavor-retaining plastic multi-layer container according to claim 8, wherein the α-olefin constituting the linear very-low-density polyethylene has from 4 to 8 carbon atoms.

11. A flavor-retaining plastic multi-layer container according to claim 8, wherein the acid-modified product of the linear very-low-density polyethylene is obtained by being grafted with a maleic anhydride in an amount of from 0.1 to 0.6 mol % per the linear low-density polyethylene.

12. A flavor-retaining plastic multi-layer container according to claim 8, wherein the linear very-low-density polyethylene or the acid-modified product thereof has a melt index (ASTM D1238, 190° C.) of from 0.4 to 30 g/10 min.

13. A flavor-retaining plastic multi-layer container according to claim 8, wherein the adhesive resin among the inner layer, outer layer and layer of the cyclic olefin copolymer, and the adhesive resin among the layers of the cyclic olefin copolymer and the layers of the ethylene/vinyl alcohol copolymer, are both an acid-modified product of a linear very-low-density polyethylene.

14. A flavor-retaining plastic multi-layer container according to claim 8, wherein the cyclic olefin copolymer contains cyclic olefin units in an amount of from 10 to 50% by weight.

15. A flavor-retaining plastic multi-layer container according to claim 8, wherein a wall of the container as a whole has a thickness of from 100 to 1000 μm, a ratio of the total thickness of the inner and outer layers to the thickness of the intermediate layer of the cyclic olefin copolymer is from 99:1 to 70:30, a ratio of the total thickness of the inner and outer layers to the thickness of the intermediate layer of the ethylene/vinyl alcohol copolymer is from 99:1 to 70:30, and the thickness of the adhesive layers is from 3 to 40 μm.

16. A flavor-retaining plastic multi-layer container according to claim 8, wherein the container is a coextruded blow-molded container.

17. A flavor-retaining plastic multi-layer container comprising an inner layer of an ethylene/vinyl alcohol copolymer, an intermediate layer of a cyclic olefin copolymer and an outer layer of a non-cyclic olefin resin which are adhered together via adhesive resin layers composed of a linear very-low-density polyethylene having a density of from 0.800 to 0.910 g/cm³ obtained by the copolymerization of an ethylene with an α-olefin of an amount of from 6 to 20 mol % per the adhesive resin, or of an acid-modified product thereof, wherein the cyclic olefin copolymer has a glass transition point (Tg) of not lower than 60° C., and the non-cyclic olefin resin forming the outer layer is a low-density polyethylene having a melt index (ASTM D1238, 190° C.) of not larger than 2 q/10 min., and a logarithmic value of melt viscosity (220° C.) of not smaller than 4.7 of when a logarithmic value of shearing rate is extrapolated to zero.

18. A flavor-retaining plastic multi-layer container according to claim 17, wherein the acid-modified product of the linear very-low-density polyethylene is obtained by being grafted with a maleic anhydride in an amount of from 0.1 to 0.6 mol % per the linear low-density polyethylene.

19. A flavor-retaining plastic multi-layer container according to claim 17, wherein a gas barrier resin layer of an ethylene/vinyl alcohol copolymer is provided between the intermediate layer of the cyclic olefin resin and the outer layer of the non-cyclic olefin resin via the adhesive resin layer.

20. A flavor-retaining plastic multi-layer container according to claim 17, wherein a gas barrier resin layer of an ethylene/vinyl alcohol copolymer is provided between the inner layer of the ethylene/vinyl alcohol copolymer and the intermediate layer of the cyclic olefin copolymer via the adhesive resin layer.

* * * * *